United States Patent
Lim et al.

(10) Patent No.: US 12,219,279 B2
(45) Date of Patent: Feb. 4, 2025

(54) IMAGE SENSOR INCLUDING AN AUTO-FOCUS PIXEL

(71) Applicant: SAMSUNG ELECTRONICS CO., LTD., Suwon-si (KR)

(72) Inventors: Jungwook Lim, Hwaseong-si (KR); Jihun Kim, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 18/513,747

(22) Filed: Nov. 20, 2023

(65) Prior Publication Data

US 2024/0098384 A1    Mar. 21, 2024

Related U.S. Application Data

(63) Continuation of application No. 17/743,724, filed on May 13, 2022, now Pat. No. 11,863,893.

(30) Foreign Application Priority Data

May 18, 2021    (KR) .................. 10-2021-0064221

(51) Int. Cl.
*H04N 25/704* (2023.01)
*H01L 27/146* (2006.01)
*H04N 25/11* (2023.01)
*H04N 25/76* (2023.01)
*H04N 25/77* (2023.01)

(52) U.S. Cl.
CPC .......... *H04N 25/704* (2023.01); *H04N 25/11* (2023.01); *H04N 25/77* (2023.01)

(58) Field of Classification Search
CPC .. H04N 25/704; H04N 25/766; H04N 25/778; H04N 25/77; H04N 25/11; H01L 27/14627
See application file for complete search history.

(56) References Cited

U.S. PATENT DOCUMENTS

| | | | |
|---|---|---|---|
| 8,638,382 B2* | 1/2014 | Itonaga | H04N 25/76 |
| | | | 348/303 |
| 8,711,270 B2 | 4/2014 | Onuki et al. | |
| 8,823,838 B2 | 9/2014 | Goto | |
| 9,794,468 B2 | 10/2017 | Fukuda | |
| 9,843,751 B2 | 12/2017 | Yamashita | |
| 9,973,682 B2 | 5/2018 | Ham | |
| 11,089,201 B2 | 8/2021 | Ouyang | |

(Continued)

*Primary Examiner* — Marly S Camargo
(74) *Attorney, Agent, or Firm* — F. CHAU & ASSOCIATES, LLC

(57) ABSTRACT

An image sensor including: a pixel array including first and second pixel groups, each of the first and second pixel groups includes of pixels arranged in rows and columns; and a row driver configured to provide transmission control signals to the pixel array, the first pixel group includes a first auto-focus (AF) pixel including photodiodes arranged in a first direction, the pixels of the first pixel group output a pixel signal through a first column line, and the second pixel group includes a second AF pixel including photodiodes arranged in a second direction perpendicular to the first direction, the pixels of the second pixel group output a pixel signal through a second column line, and the first AF pixel of the first pixel group and the second AF pixel of the second pixel group receive same transmission control signals.

20 Claims, 21 Drawing Sheets

(56) References Cited

U.S. PATENT DOCUMENTS

| | | | |
|---|---|---|---|
| 11,626,447 B2 | 4/2023 | Kim et al. | |
| 11,863,893 B2* | 1/2024 | Lim | H04N 25/704 |
| 11,950,011 B2* | 4/2024 | Lim | H04N 25/77 |
| 2016/0344968 A1* | 11/2016 | Ochiai | H04N 25/704 |
| 2017/0019584 A1 | 1/2017 | Ham | |
| 2018/0366385 A1 | 12/2018 | Hashimoto et al. | |
| 2020/0273894 A1 | 8/2020 | Inui et al. | |
| 2020/0358971 A1 | 11/2020 | Shim et al. | |
| 2020/0358989 A1 | 11/2020 | Hoshino | |
| 2020/0396400 A1 | 12/2020 | Takahashi | |
| 2021/0175270 A1 | 6/2021 | Pang et al. | |
| 2022/0279150 A1* | 9/2022 | Xu | H04N 23/672 |
| 2022/0377267 A1 | 11/2022 | Lim et al. | |
| 2024/0205566 A1* | 6/2024 | Cho | H04N 25/772 |
| 2024/0214703 A1* | 6/2024 | Park | H04N 25/77 |

\* cited by examiner

IMAGE SENSOR INCLUDING AN AUTO-FOCUS PIXEL

CROSS-REFERENCE TO RELATED APPLICATIONS

This application is a continuation of U.S. patent application Ser. No. 17/743,724 filed on May 13, 2022, which claims priority under 35 U.S.C. § 119 to Korean Patent Application No. 10-2021-0064221, filed on May 18, 2021, in the Korean Intellectual Property Office, the disclosures of which are incorporated by reference herein in their entireties.

TECHNICAL FIELD

The inventive concept relates to an image sensor, and more particularly, to an image sensor including an auto-focus (AF) pixel.

DISCUSSION OF RELATED ART

An image sensor is a device that captures an image and converts the image into an electric signal. An image sensor is used in a variety of electronic devices such as a digital camera, a mobile phone camera, a mobile camcorder, as well as in cameras attached to cars, security devices, and robots. The image sensor includes a pixel array, and each pixel in the pixel array may include a photodiode. A photodiode may react according to the intensity of light reflected from an object. An auto focus (AF) function is employed an image sensor so that image capturing is accurately performed in a short time period.

SUMMARY

The inventive concept provides an image sensor capable of quickly performing an auto-focus (AF) function in vertical and horizontal directions.

According to an embodiment of the inventive concept, there is provided an image sensor including: a pixel array including a first pixel group and a second pixel group, wherein each of the first pixel group and the second pixel group includes a plurality of pixels arranged in a plurality of rows and a plurality of columns; and a row driver configured to provide a plurality of transmission control signals to the pixel array, wherein the first pixel group includes a first auto-focus (AF) pixel including a plurality of photodiodes arranged in a first direction, wherein the plurality of pixels of the first pixel group output a pixel signal through a first column line, and wherein the second pixel group includes a second AF pixel including a plurality of photodiodes arranged in a second direction perpendicular to the first direction, wherein the plurality of pixels of the second pixel group output a pixel signal through a second column line, and wherein the first AF pixel of the first pixel group and the second AF pixel of the second pixel group receive same transmission control signals.

According to an embodiment of the inventive concept, there is provided an image sensor including: a pixel array including a first pixel group and a second pixel group, wherein each of the first pixel group and the second pixel group includes a plurality of pixels arranged in a plurality of rows and a plurality of columns; and a row driver configured to provide a plurality of transmission control signals to the pixel array, wherein the first pixel group includes a first AF pixel including a plurality of photodiodes arranged in parallel in a first direction, and the second pixel group includes a second AF pixel including a plurality of photodiodes arranged in parallel in a second direction crossing the first direction, wherein the first pixel group includes a first color filter, the second pixel group includes a second color filter that is different from the first color filter, and wherein the first AF pixel of the first pixel group and the second AF pixel of the second pixel group receive same transmission control signals.

According to an embodiment of the inventive concept, there is provided an image sensor including: a pixel array including a plurality of pixels each including a plurality of photodiodes; a row driver configured to provide a plurality of transmission control signals to the pixel array, wherein the plurality of pixels include a first AF pixel including a plurality of photodiodes arranged in parallel in a first direction, and a second AF pixel including a plurality of photodiodes arranged in parallel in a second direction crossing the first direction, and wherein the first AF pixel and the second AF pixel receive a same transmission control signal.

BRIEF DESCRIPTION OF THE DRAWINGS

Embodiments of the inventive concept will be more clearly understood from the following detailed description taken in conjunction with the accompanying drawings in which.

DETAILED DESCRIPTION OF THE EMBODIMENTS

Hereinafter, embodiments of the inventive concept will be described in detail with reference to the accompanying drawings.

Figure 1:
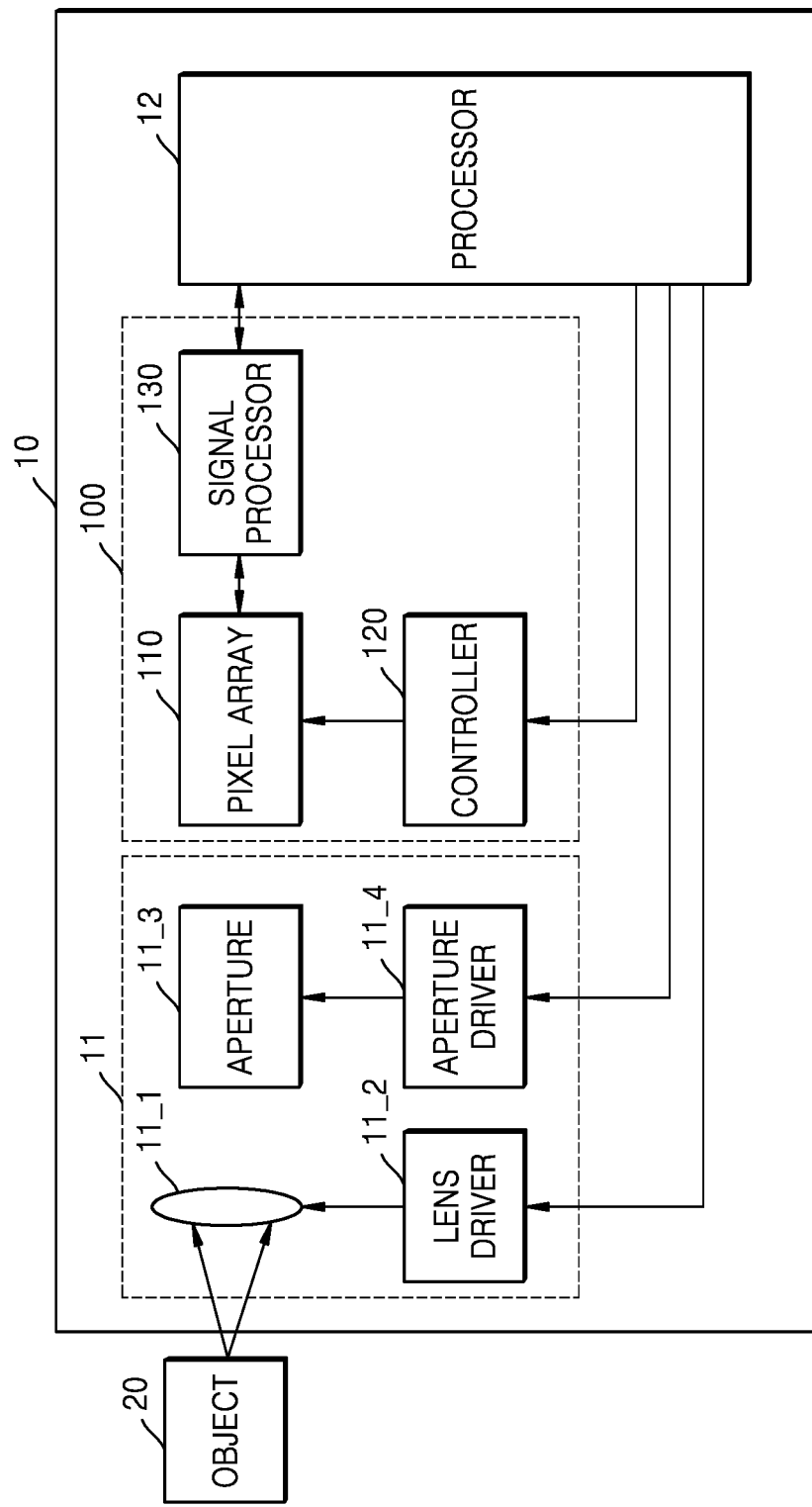
FIG. 1 is a diagram of a structure of a digital imaging device according to an embodiment of the inventive concept.

FIG. 1 is a diagram of a structure of a digital imaging device 10 according to an embodiment of the inventive concept. FIG. 1 will be used to describe the performance of an auto-focus (AF) function by the digital imaging device 10.

The digital imaging device 10 may include an imaging unit 11, an image sensor 100, and a processor 12. The digital imaging device 10 may have a focus detection function.

All operations of the digital imaging device 10 may be controlled by the processor 12. The processor 12 may provide control signals to a lens driver 11_2, an aperture driver 11_4, and a controller 120 of the image sensor 100 to individually operate these components.

As a component configured to receive light, the imaging unit 11 may include a lens 11_1, the lens driver 11_2, an aperture 11_3, and an aperture driver 11_4. The lens 11_1 may include a plurality of lenses.

The lens driver 11_2 may exchange information regarding focus detection with the processor 12, and may adjust a position of the lens 11_1 according to the control signal provided by the processor 12. In other words, the lens driver 11_2 may receive information regarding focus detection from the processor 12. The lens driver 11_2 may shift the lens 11_1 in a direction in which a distance from an object 20 increases or decreases. By doing so, the distance between the lens 11_1 and the object 20 may be adjusted. According to the position of the lens 11_1, a focus on the object 20 may be accurate or may be blurred.

For example, when the distance between the lens 11_1 and the object 20 is relatively small, the lens 11_1 may be out of an in-focus position and a phase difference may occur between images captured by the image sensor 100. The lens driver 11_2 may shift the lens 11_1 in a direction in which the distance from the object 20 increases, based on the control signal provided by the processor 12. By shifting the lens 11_1 this way, the lens 11_1 may be in the in-focus position so that the object 20 may be accurately imaged.

Alternatively, when the distance between the lens 11_1 and the object 20 is relatively great, the lens 11_1 may be out of the in-focus position, and a phase difference may occur between images captured by the image sensor 100. The lens driver 11_2 may shift the lens 11_1 in a direction in which the distance from the object 20 decreases, based on the control signal provided by the processor 12. In this case, the lens 11_1 may be adjusted to the in-focus position.

The image sensor 100 may convert incident light into an image signal. The image sensor 100 may include a pixel array 110, the controller 120, and a signal processor 130. An optical signal transmitted through the lens 11_1 and the aperture 11_3 may form an image of the object 20 at a light receiving surface of the pixel array 110.

The pixel array 110 may include a complementary metal oxide semiconductor image sensor (CSI) that converts an optical signal into an electric signal. Properties such as the sensitivity of the pixel array 110 may be adjusted by the controller 120. The pixel array 110 may include a plurality of pixels that convert the optical signal into an electric signal. The plurality of pixels may each generate a pixel signal according to the intensity of sensed light.

The image sensor 100 may provide image information to the processor 12, and the processor 12 may perform a phase difference calculation by using the image information. For example, the processor 12 may receive image information according to a pixel signal generated by an AF pixel from the signal processor 130 to perform a phase difference operation, and a result of the phase difference calculation may be obtained by performing a correlation operation on the image information. The processor 12 may obtain an in-focus position, a focus direction, or a distance between the object 20 and the image sensor 100, and the like as results of the phase difference calculation. Based on the results of the phase difference calculation, the processor 12 may output the control signal to the lens driver 11_2 to shift the position of the lens 11_1.

The processor 12 may reduce noise of an input signal and perform image signal processing to increase image quality, for example, gamma correction, color filter array interpolation, color matrix correction, color correction, color enhancement, and the like. In addition, the processor 12 may generate an image file by performing a compression process on image data that is generated by performing an image signal process for increasing image quality, or alternatively, may restore the image data from the image file.

Figure 2:
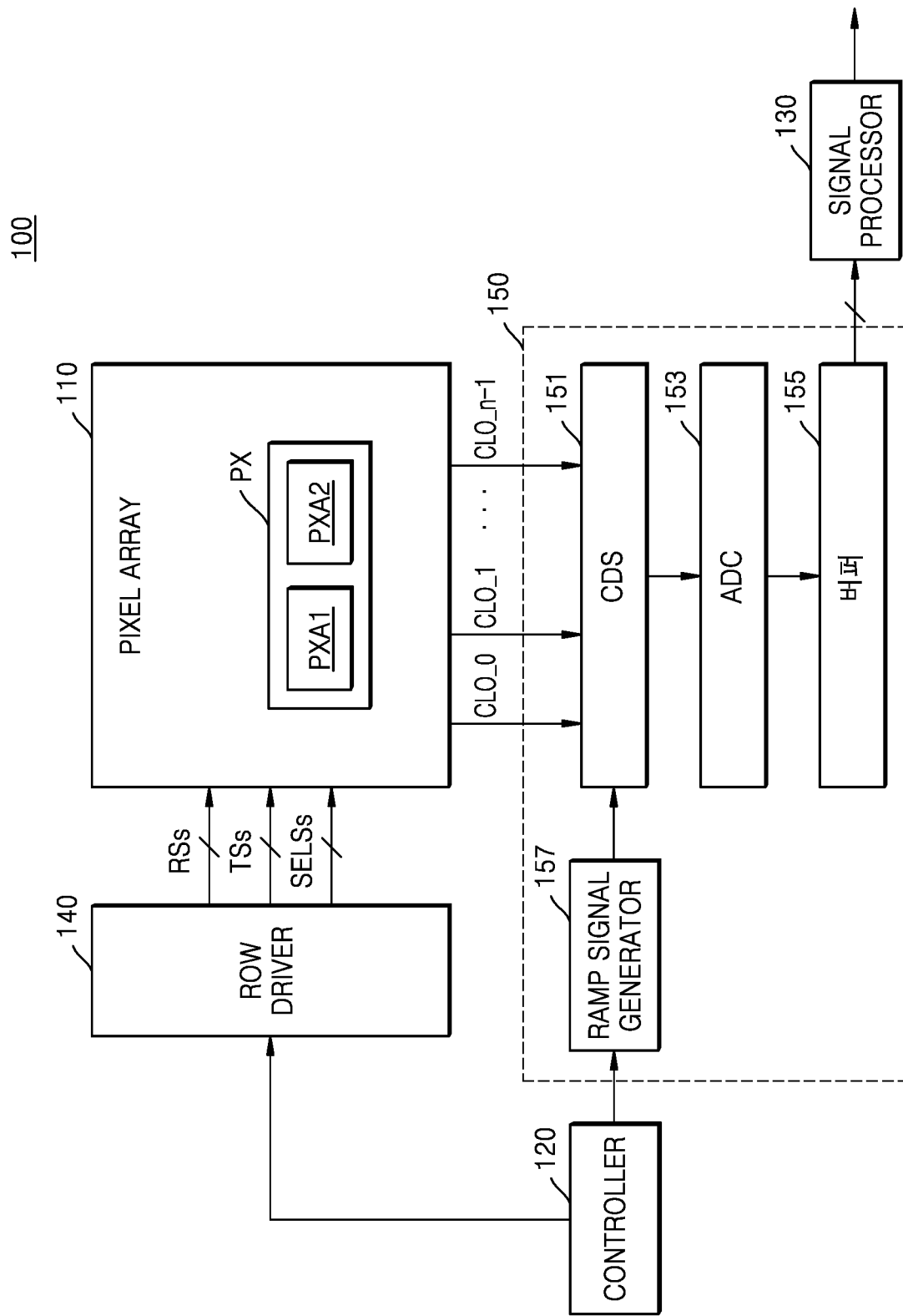
FIG. 2 is a block diagram of a configuration of an image sensor according to an embodiment of the inventive concept.

FIG. 2 is a block diagram of a configuration of the image sensor 100 according to an embodiment of the inventive concept.

Referring to FIG. 2, the image sensor 100 may include the pixel array 110, the controller 120, the signal processor 130, a row driver 140, and a signal read-out circuit 150. The signal read-out circuit 150 may include a correlated-double sampler (CDS) 151, an analog-digital converter (ADC) 153, and a buffer 155.

The pixel array 110 may include a plurality of pixels PXs that convert an optical signal into an electric signal. The plurality of pixels PXs may respectively generate pixel signals according to the intensity of sensed light. The plurality of pixels PXs may include AF pixels AFPXs configured to perform an AF function or a distance measurement function. In an embodiment of the inventive concept, each of the plurality of pixels PX included in the pixel array 110 may be an AF pixel and include a plurality of photodiodes.

The plurality of pixels PX may include a plurality of first AF pixels PXA1 and a plurality of second AF pixels PXA2. The first AF pixel PXA1 may include a plurality of photodiodes arranged in parallel in a first direction X to perform an AF function in the first direction (e.g., an X-axis direction of FIG. 3). The second AF pixel PXA2 may include a plurality of photodiodes arranged in parallel in a second direction Y to perform the AF function in the second direction (e.g., a Y-axis direction of FIG. 3).

The plurality of pixels PX may respectively output pixel signals to the CDS 151 through first to n-th column output lines CLO_0 to CLO_n−1 which respectively correspond to the plurality of pixels PX. In an AF mode, the pixel signals output from the plurality of pixels PX may include phase signals used to calculate phase differences. The phase signals may include information regarding positions of images formed on the image sensor 100, and an in-focus position of a lens (e.g., the lens 11_1 shown in FIG. 1) may be determined based on the calculated phase differences. For example, a position of the lens 11_1, at which the phase difference is 0, may be the in-focus position. In other words, when there is no phase difference, the lens 11_1 is in the in-focus position.

The phase signals not only may have a function to focus on the object, but also may be used to measure a distance between the object (e.g., the object 20 in FIG. 1) and the image sensor 100. To measure the distance between the object 20 and the image sensor 100, additional information such as the phase differences among the images formed on the image sensor 100, a distance between the lens 11_1 and the image sensor 100, a size of the lens 11_1, the in-focus position of the lens 11_1, and the like may be used.

The controller 120 may control the row driver 140 to drive the pixel array 110 to absorb light and accumulate an electric charge, temporarily store the accumulated electric charge, and output an electric signal according to the stored electric charge outside the pixel array 110. In addition, the controller 120 may control the signal read-out circuit 150 to measure a level of the pixel signal provided by the pixel array 110.

The row driver 140 may generate signals (e.g., reset control signals RSs, transmission control signals TSs, and selection signals SELSs) to control the pixel array 110, and may provide the signals to the plurality of pixels PXs. The row driver 140 may determine an activation timing and a deactivation timing of the reset control signals RSs, the transmission control signals TSs, and the selection signals SELSs that are provided to the plurality of pixels PXs to perform the AF function or an image capturing function.

In an embodiment of the inventive concept, the pixel array 110 may receive the same transmission control signal TS from the row driver 140, and include the first AF pixel PXA1 and the second AF pixel PXA2 respectively connected to different column output lines among the first to n-th column output lines CLO_0 to CLO_n–1. Accordingly, the image sensor 100 according to an embodiment of the inventive concept may simultaneously perform the AF function in the first direction X and the AF function in the second direction Y using the phase signals output from the first AF pixel PXA1 and the phase signals output from the second AF pixel PXA2, and thus, the image sensor 100 may provide the AF function in the first direction X and the AF function in the second direction Y at a high speed.

The CDS 151 may sample and hold the pixel signal provided by the pixel array 110. The CDS 151 may perform double sampling with respect to a level of a certain noise and a level of the pixel signal, thereby outputting levels corresponding to a difference therebetween. In addition, the CDS 151 may receive an input of ramp signals generated by a ramp signal generator 157 of the signal read-out circuit 150, compare the pixel signal with the ramp signals, and output a comparison result. The ADC 153 may convert analog signals, which correspond to the levels received from the CDS 151, into digital signals. The buffer 155 may latch the digital signals, and the latched signals may be sequentially output to the signal processor 130 or to the outside of the image sensor 100.

The signal processor 130 may perform signal processing based on the pixel signals output from the plurality of pixels PX. For example, the signal processor 130 may perform a noise reduction process, a gain adjustment process, a waveform shaping process, an interpolation process, a white balance process, a gamma process, an edge enhancement process, etc. In addition, the signal processor 130 may perform the signal processing based on the phase signals, which are output from the plurality of pixels PX during an AF operation, and may output the signal-processed information to the processor 12, thereby allowing the processor 12 to perform the phase difference calculation for the AF operation. In an embodiment of the inventive concept, the signal processor 130 may also be provided in a processor (e.g., the processor 12 shown in FIG. 1) outside the image sensor 100.

Figure 3:
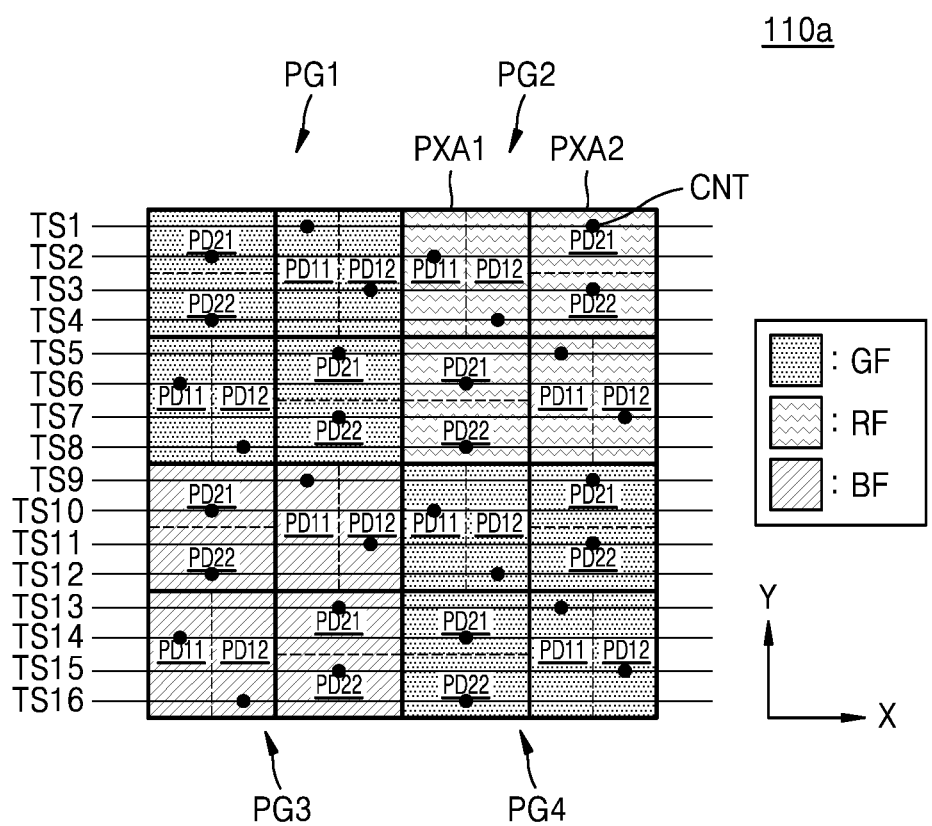
FIG. 3 is a diagram illustrating a pixel array of an image sensor according to an embodiment of the inventive concept.

FIG. 3 is a diagram illustrating a pixel array 110a of the image sensor 100 according to an embodiment of the inventive concept. The pixel array 110a is an example of a part of the pixel array 110 shown in FIG. 2. In the drawings to be discussed below, a connection relationship between transmission control signal lines providing transmission control signals to pixels and the pixels is indicated through a connect CNT. In the drawings to be discussed below, the connect CNT arranged on a specific photodiode may indicate that the transmission control signal provided through the transmission control signal line connected to the connect CNT is input to a gate of a transmission transistor connected to the specific photodiode. The transmission control signals described below may be included in the transmission control signals TSs of FIG. 2. In addition, in the drawings to be discussed below, the pixels illustrated as being connected to the same transmission control signal line may include both an embodiment in which the pixels are connected to the same transmission control line, and an embodiment in which the pixels are connected to different transmission control signal lines but receive the same transmission control signal.

Referring to FIG. 3, the pixel array 110a may include a plurality of pixel groups, for example, first through fourth pixel groups PG1 to PG4. The first to fourth pixel groups PG1 to PG4 may be referred to interchangeably as the first AF pixel group PG1 to the fourth AF pixel group PG4. The first AF pixel group PG1 and the second AF pixel group PG2 may be arranged in sequence in the first direction X, and the third pixel group PG3 and the fourth pixel group PG4 may be arranged in sequence in the first direction X. The first AF pixel group PG1 and the third pixel group PG3 may be arranged in sequence in the second direction Y, and the second AF pixel group PG2 and the fourth pixel group PG4 may be arranged in sequence in the second direction Y.

Each of the first to fourth pixel groups PG1 to PG4 may include four pixels arranged in two rows and two columns. In an embodiment of the inventive concept, each of the first to fourth pixel groups PG1 to PG4 may include a first AF pixel PXA1 and a second AF pixel PXA2. The first AF pixel PXA1 may include a first photodiode PD11 and a second photodiode PD12 arranged adjacent to each other in the first direction X, and the second AF pixel PXA2 may include a first photodiode PD21 and a second photodiode PD22 arranged adjacent to each other in the second direction Y.

For example, each of the first to fourth pixel groups PG1 to PG4 may include a first AF pixel PXA1 and a second AF pixel PXA2 arranged in a first row, and may include the first AF pixel PXA1 and the second AF pixel PXA2 arranged in a second row. In other words, each of the first to fourth pixel groups PG1 to PG4 may include two first AF pixels PXA1 and two second AF pixels PXA2. However, the inventive concept is not limited thereto, and the number and arrangement relationship of the first AF pixels PXA1 and the second AF pixels PXA2 included in each of the first to fourth pixel groups PG1 to PG4 may be variously modified.

In this case, the same micro lens may be arranged on the first photodiode PD11 and the second photodiode PD12 of the first AF pixel PXA1, and the same micro lens may be arranged on the first photodiode PD21 and the second photodiode PD22 of the second AF pixel PXA2. In other words, there may be four micro-lenses provided for each of the pixel groups PG1 to PG4. An amount of charges generated by each of first and second photodiodes included in each of the pixels may vary depending on the shape and refractive index of the micro lens, and an AF function may be performed based on a first pixel signal corresponding to the amount of charges of the first photodiode and a second pixel signal corresponding to the amount of charges of the second photodiode. The shape of the micro lens arranged in the pixel array 110a will be described later with reference to FIGS. 6A and 6B.

The first AF pixel group PG1 and the second AF pixel group PG2 may receive first, second, third, fourth, fifth, sixth, seventh and eighth transmission control signals TS1, TS2, TS3, TS4, TS5, TS6, TS7 and TS8, and the third AF pixel group PG3 and the fourth AF pixel group PG4 may receive ninth, tenth, eleventh, twelfth, thirteenth, fourteenth, fifteenth and sixteenth transmission control signals TS9, TS10, TS11, TS12, TS13, TS14, TS15 and TS16.

In an embodiment of the inventive concept, the same transmission control signal (e.g., TS1 and TS3) may be provided to the first AF pixel PXA1 included in the first AF pixel group PG1 and the second AF pixel PXA2 included in the second AF pixel group PG2, and the same transmission control signal (e.g., TS2 and TS4) may be provided to the second AF pixel PXA2 included in the first AF pixel group PG1 and the first AF pixel PXA1 included in the second AF pixel group PG2. In addition, in an embodiment of the inventive concept, the same transmission control signal (e.g., TS9 and TS11) may be provided to the first AF pixel PXA1 included in the third AF pixel group PG3 and the second AF pixel PXA2 included in the fourth AF pixel group PG4, and the same transmission control signal (e.g., TS10 and TS12) may be provided to the second AF pixel PXA2 included in the third AF pixel group PG3 and the first AF pixel PXA1 included in the fourth AF pixel group PG4.

For example, the first AF pixel PXA1 arranged in the first row of the first AF pixel group PG1 and the second AF pixel PXA2 arranged in the first row of the second AF pixel group PG2 may receive the same transmission control signals TS1 and TS3, and the second AF pixel PXA2 arranged in the first row of the first AF pixel group PG1 and the first AF pixel PXA1 arranged in the first row of the second AF pixel group PG2 may receive the same transmission control signals TS2 and TS4. In addition, for example, the first AF pixel PXA1 arranged in the second row of the first AF pixel group PG1 and the second AF pixel PXA2 arranged in the second row of the second AF pixel group PG2 may receive the same transmission control signals TS6 and TS8, and the second AF pixel PXA2 arranged in the second row of the first AF pixel group PG1 and the first AF pixel PXA1 arranged in the second row of the second AF pixel group PG2 may receive the same transmission control signals TS5 and TS7. As described above, the description of the transmission control signals provided to the first AF pixel group PG1 and the second AF pixel group PG2 arranged in sequence in the first direction X may be equally applied to the third AF pixel group PG3 and the fourth AF pixel group PG4 arranged in sequence to each other in the first direction X.

The first AF pixel group PG1 and the second AF pixel group PG2 may be connected to different column output lines (e.g., different from each other among the first to n-th column output lines CLO_0 to CLO_n−1 of FIG. 2), respectively, and may output pixel signals through the different column output lines, respectively. For example, the first AF pixel group PG1 may be connected to an i-th column output line (CLO_i, where i is an integer greater than or equal to 0 and less than n−1), and the second AF pixel group PG2 may be connected to an (i+1)-th column output line.

In addition, the third AF pixel group PG3 and the fourth AF pixel group PG4 may be connected to different column output lines, respectively, and may output pixel signals through different column output lines, respectively.

The same transmission control signal may be provided to the first AF pixel PXA1 of the first AF pixel group PG1 and the second AF pixel PXA2 of the second AF pixel group PG2 and the first AF pixel PXA1 of the first AF pixel group PG1 and the second AF pixel PXA2 of the second AF pixel group PG2 may output the pixel signals through different column output lines. In this case, the first AF pixel PXA1 of the first AF pixel group PG1 and the second AF pixel PXA2 of the second AF pixel group PG2 may simultaneously output pixel signals including AF information. Accordingly, the image sensor 100 according to an embodiment of the inventive concept may simultaneously perform an AF operation in the first direction X and an AF operation in the second direction Y.

The pixel array 110a may include a color filter to sense various colors. In an embodiment of the inventive concept, each of the first to fourth pixel groups PG1 to PG4 may include one of a green color filter GF, a red color filter RE and a blue color filter BF. Each of the first to fourth pixel groups PG1 to PG4 may include a color filter to correspond to a Bayer pattern. For example, the first AF pixel group PG1 and the fourth AF pixel group PG4 may include the green color filter GF, the second AF pixel group PG2 may include the red color filter RF, and the third AF pixel group PG3 may include the blue color filter BF. However, the inventive concept is not limited thereto, and each of the first to fourth pixel groups PG1 to PG4 may include at least one of a white color filter, a yellow color filter, a cyan color filter, and or a magenta color filter.

Figure 4:
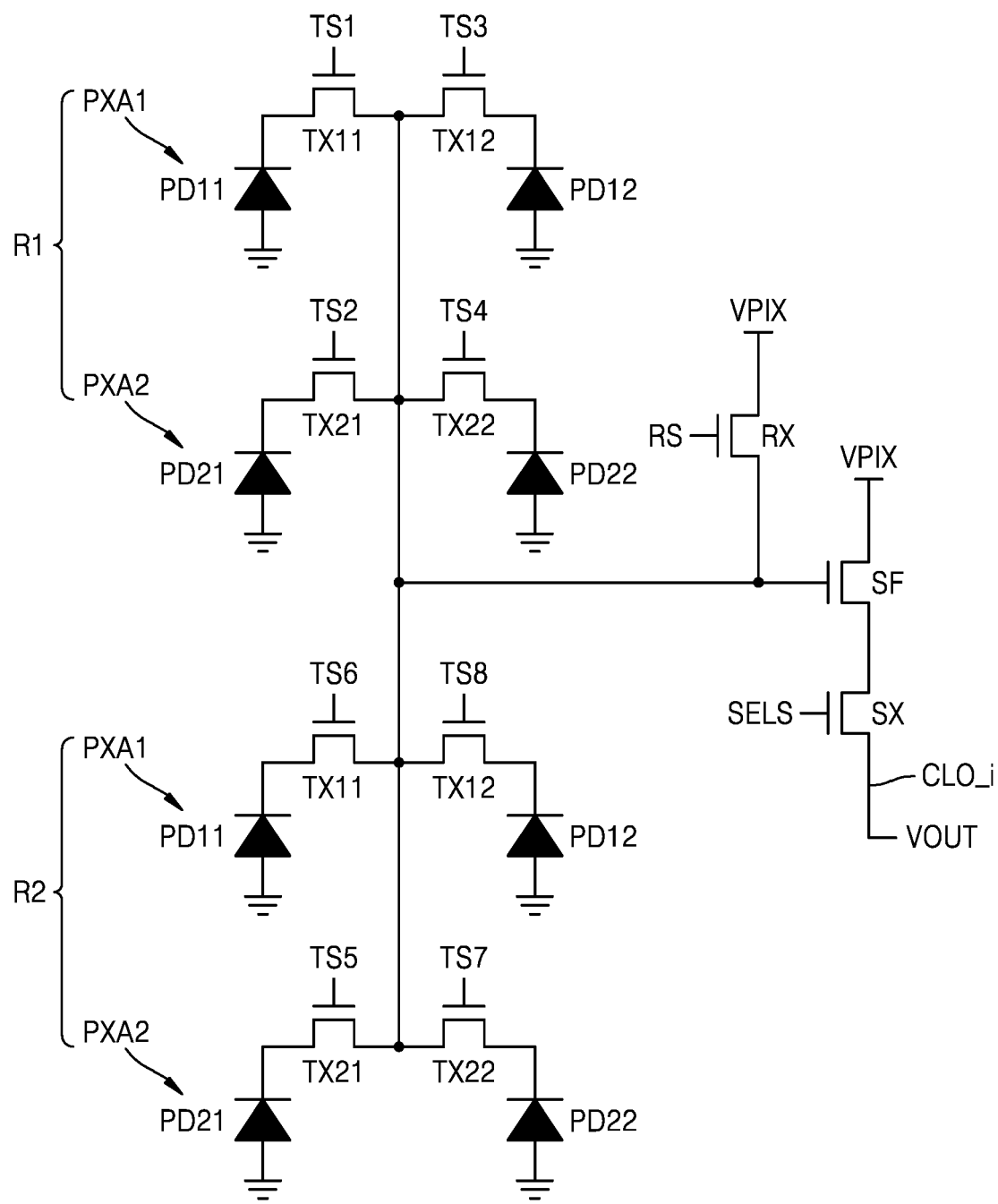
FIG. 4 is a circuit diagram of a first pixel group of FIG. 3.

FIG. 4 is a circuit diagram of the first pixel group PG1 of FIG. 3. In FIG. 4, an embodiment in which pixels included in the first pixel group PG1 share a floating diffusion region is described, but this is for convenience of description, and the same description may be applied to the other pixel groups (e.g., the second to fourth pixels groups PG2 to PG4).

Referring to FIGS. 3 and 4, the first AF pixel PXA1 arranged in the first row R1 of the first pixel group PG1 may include the first photodiode PD11, a first transmission transistor TX11, the second photodiode PD12, and a second transmission transistor TX12. The second AF pixel PXA2 arranged in the first row R1 of the first pixel group PG1 may include the first photodiode PD21, the first transmission transistor TX21, the second photodiode PD22, and the second transmission transistor TX22.

The first AF pixel PXA1 arranged in the second row R2 of the first pixel group PG1 may include the first photodiode PD11, the first transmission transistor TX11, the second photodiode PD12, and the second transmission transistor TX12. The second AF pixel PXA2 arranged in the second row R2 of the first pixel group PG1 may include the first photodiode PD21, the first transmission transistor TX21, the second photodiode PD22, and the second transmission transistor TX22.

Each of the first photodiodes PD11 of the first AF pixels PXA1, the second photodiodes PD12 of the first AF pixels PXA1, the first photodiodes PD21 of the second AF pixels PXA2, and the second photodiodes PD22 of the second AF pixels PXA2 may generate photocharges that vary according to the intensity of light. For example, each of the first photodiodes PD11 and PD21 and the second photodiodes PD12 and PD22 is a PN junction diode, and may generate holes that are charges, e.g., electrons that are negative charges and holes that are positive charges, in proportion to the amount of incident light. Each of the first photodiodes PD11 and PD21 and the second photodiodes PD12 and PD22 may be at least one of a phototransistor, a photogate, and a pinned photodiode (PPD) and combinations thereof as an example of a photoelectric conversion device.

Each of the first transmission transistors TX11 and TX21 arranged in the first row R1 may transmit photocharges generated by each of the first photodiodes PD11 and PD21 arranged in the first row R1 in response to the first transmission control signal TS1 and the second transmission control signal TS2 to a floating diffusion region FD. When each of the first transmission transistors TX11 and TX21 arranged in the first row R1 is turned on, photocharges generated by each of the first photodiodes PD11 and PD21 of the first row R1 may be accumulated and stored in the floating diffusion region FD. Each of the second transmission transistors TX12 and TX22 arranged in the first row R1 may transmit photocharges generated by each of the second photodiodes PD12 and PD22 arranged in the first row R1 in response to the third transmission control signal TS3 and the fourth transmission control signal TS4 to the floating diffusion region FD.

In addition, each of the first transmission transistors TX11 and TX21 arranged in the second row R2 may transmit photocharges generated by each of the first photodiodes PD11 and PD21 arranged in the second row R2 in response to the sixth transmission control signal TS6 and the fifth transmission control signal TS5 to the floating diffusion region FD. Each of the second transmission transistors TX12 and TX22 arranged in the second row R2 may transmit photocharges generated by each of the second photodiodes PD12 and PD22 arranged in the second row R2 in response to the eighth transmission control signal TS8 and the seventh transmission control signal TS7 to the floating diffusion region FD. The floating diffusion region FD may correspond to a node between the second AF pixel PXA2 of the first row R1 and the first AF pixel PXA1 of the second row R2.

The first pixel group PG1 may include a selection transistor SX, a source follower SF, and a reset transistor RX. However, unlike that shown in FIG. 4, at least one of the selection transistor SX, the source follower SF, and the reset transistor RX may be omitted.

In an embodiment of the inventive concept, the pixels included in the first pixel group PG1, for example, the first AF pixel PXA1 in the first row R1, the second AF pixel PXA2 in the first row R1, the first AF pixel PXA1 in the second row R2, and the second AF pixel PXA2 in the second row R2, may share the floating diffusion region FD, may share the selection transistor SX, the source follower SF, and the reset transistor RX, and may output a pixel signal VOUT through the same column output line CLO_i. In this regard, the i-th column output line (CLO_i, i is an integer greater than or equal to 0 and less than n−1) may be a column output line of one, for example, of the first to n-th column output lines CLO_0 to CLO_n−1 of FIG. 2. However, unlike that shown in FIG. 4, each of the pixels included in the first pixel group PG1 may accumulate charges in different floating diffusion regions or may output a pixel signal through different column output lines. Alternatively, some of the pixels included in the first pixel group PG1 may share the floating diffusion region FD.

The reset transistor RX may periodically reset charges accumulated in the floating diffusion region FD. A source electrode of the reset transistor RX may be connected to the floating diffusion region FD, and a drain electrode of the reset transistor RX may be connected to a power voltage VPIX. When the reset transistor RX is turned on according to the reset control signal RS, the power voltage VPIX connected to the drain electrode of the reset transistor RX is transferred to the floating diffusion region FD. When the reset transistor RX is turned on, charges accumulated in the floating diffusion region FD may be discharged to reset the floating diffusion region FD.

The source follower SF may be controlled according to the amount of photocharges accumulated in the floating diffusion region FD. The source follower SF is a buffer amplifier and may buffer a signal according to charges stored in the floating diffusion region FD. The source follower SF may amplify a potential change in the floating diffusion region FD and output the potential change as the pixel signal VOUT through the i-th column output line CLO_i. The floating diffusion region FD may correspond to a node between the source electrode of the reset transistor RX and a gate terminal of the source follower SF. A drain terminal of the source follower SF may be connected to the power voltage VPIX.

The selection transistor SX may have a drain terminal connected to a source terminal of the source follower SF, and in response to the selection signal SELS, output the pixel signal VOUT to the CDS (e.g., 151 in FIG. 1) through the column output line CLO_i.

Figure 5A:
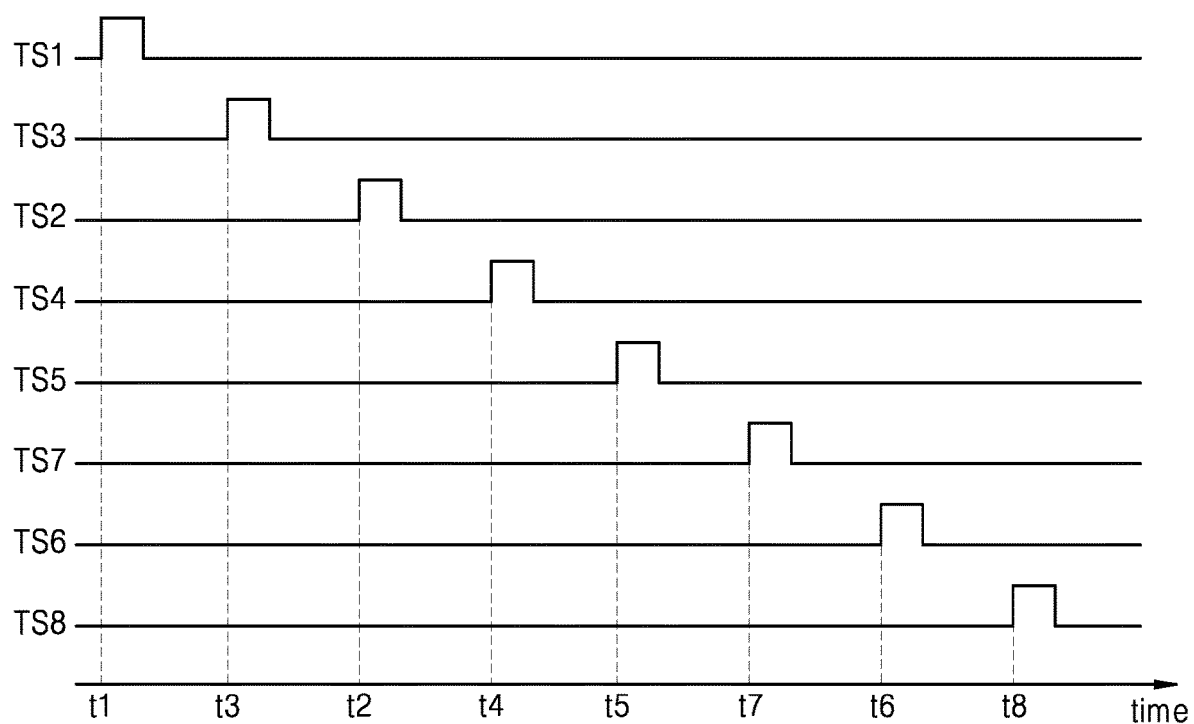
FIGS. 5A and 5B are timing diagrams illustrating transmission control signals provided to a first pixel group and a second pixel group of FIG. 3.
Figure 5B:
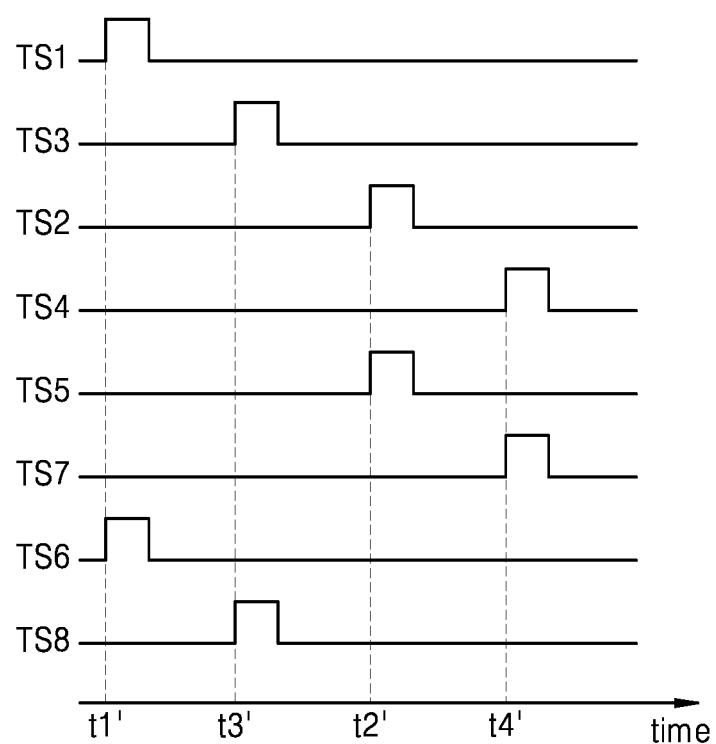

FIGS. 5A and 5B are timing diagrams illustrating transmission control signals provided to the first pixel group PG1 and the second pixel group PG2 of FIG. 3.

Referring to FIGS. 3 and 5A, when an image sensor according to an embodiment of the inventive concept performs an AF operation, the first transmission control signal TS1, the third transmission control signal TS3, the second transmission control signal TS2, the fourth transmission control signal TS4, the fifth transmission control signal TS5, the seventh transmission control signal TS7, the sixth transmission control signal TS6, and the eighth transmission control signal TS8 may sequentially transition from a logic low level to a logic high level at first, third, second, fourth, fifth, seventh, sixth, and eighth times t1, t3, t2, t4, t5, t7, t6, and t8, respectively. Transmission transistors that respectively provide the first transmission control signal TS1, the third transmission control signal TS3, the second transmission control signal TS2, the fourth transmission control signal TS4, the fifth transmission control signal TS5, the seventh transmission control signal TS7, the sixth transmission control signal TS6, and the eighth transmission control signal TS8 may be turned on at the first, third, second, fourth, fifth, seventh, sixth, and eighth times t1, t3, t2, t4, t5, t7, t6, and t8, respectively, so that pixel signals corresponding to photocharges generated by the photodiodes corresponding to the transmission transistors may be generated, respectively.

Accordingly, firstly, an image sensor according to an embodiment of the inventive concept may perform an AF operation in the first direction X using the pixel signals output from the first AF pixel PXA1 arranged in a first row of the first pixel group PG1, and may perform the AF operation in the second direction Y using the pixel signals output from the second AF pixel PXA2 arranged in a first row of the second pixel group PG2. Thereafter, secondly, the image sensor according to an embodiment of the inventive concept may perform the AF operation in the second direction Y using the pixel signals output from the second AF pixel PXA2 arranged in the first row of the first pixel group PG1, and may perform the AF operation in the first direction X using the pixel signals output from the first AF pixel PXA1 arranged in the first row of the second pixel group PG2. Thirdly, the image sensor according to an embodiment of the inventive concept may perform the AF operation in the second direction Y using the pixel signals output from the second AF pixel PXA2 arranged in the second row of the first pixel group PG1, and may perform the AF operation in the first direction X using the pixel signals output from the first AF pixel PXA1 arranged in the second row of the second pixel group PG2. Finally, the image sensor according to an embodiment of the inventive concept may perform the AF operation in the first direction X using the pixel signals output from the first AF pixel PXA1 arranged in the second row of the first pixel group PG1 and may perform the AF operation in the second direction Y using the pixel signals output from the second AF pixel PXA2 arranged in the second row of the second pixel group PG2.

Referring to FIGS. 3 and 5B, during the AF operation, the first transmission control signal TS1 and the sixth transmission control signal TS6 may transition together from a logic low level to a logic high level at a first time t1', and the transmission transistors that respectively provide the first transmission control signal TS1 and the sixth transmission control signal TS6 may be turned on at the first time t3'. The third transmission control signal TS3 and the eighth transmission control signal TS8 may transition together from the logic low level to the logic high level at a third time t3' after the first time t3', and the transmission transistors that respectively provide the third transmission control signal TS3 and the eighth transmission control signal TS8 may be turned on at the third time t3'. The second transmission control signal TS2 and the fifth transmission control signal TS5 may transition together from the logic low level to the logic high level at a second time t2' after the third time t3', and the transmission transistors that respectively provide the second transmission control signal TS2 and the fifth transmission control signal TS5 may be turned on at the second time t2'. In addition, the fourth transmission control signal TS4 and the seventh transmission control signal TS7 may transition together from the logic low level to the logic high level at a fourth time t4' after the second time t2', and the transmission transistors that respectively provide the fourth transmission control signal TS4 and the seventh transmission control signal TS7 may be turned on at the fourth time t4'.

Accordingly, the image sensor according to the embodiments of the inventive concept may perform the AF operation in the first direction X using the pixel signals output from the first AF pixels PXA1 arranged in the first row and the second row of the first pixel group PG1, and may perform the AF operation in the second direction Y using the pixel signals output from the second AF pixels PXA2 arranged in the first row and the second row of the second pixel group PG2. Thereafter, the image sensor according to the embodiments of the inventive concept may perform the AF operation in the second direction Y using the pixel signals output from the second AF pixels PXA2 arranged in the first row and the second row of the first pixel group PG1 and may perform the AF operation in the first direction X using the pixel signals output from the first AF pixels PXA1 arranged in the first row and the second row of the second pixel group PG2.

The first to eighth transmission control signals TS1 to TS8 described with reference to FIGS. 5A and 5B are examples, and the image sensor according to the embodiments of the inventive concept is not limited thereto. A time at which each of the first to eighth transmission control signals TS1 to TS8 transitions may vary according to the intensity of light. For example, when relatively bright light is incident on the image sensor, the first to eighth transmission control signals TS1 to TS8 described with reference to FIG. 5A may be provided to the pixel array 110a, and when relatively dark light is incident on the image sensor, the first to eighth transmission control signals TS1 to TS8 described with reference to FIG. 5B may be provided to the pixel array 110a.

Figure 6A:
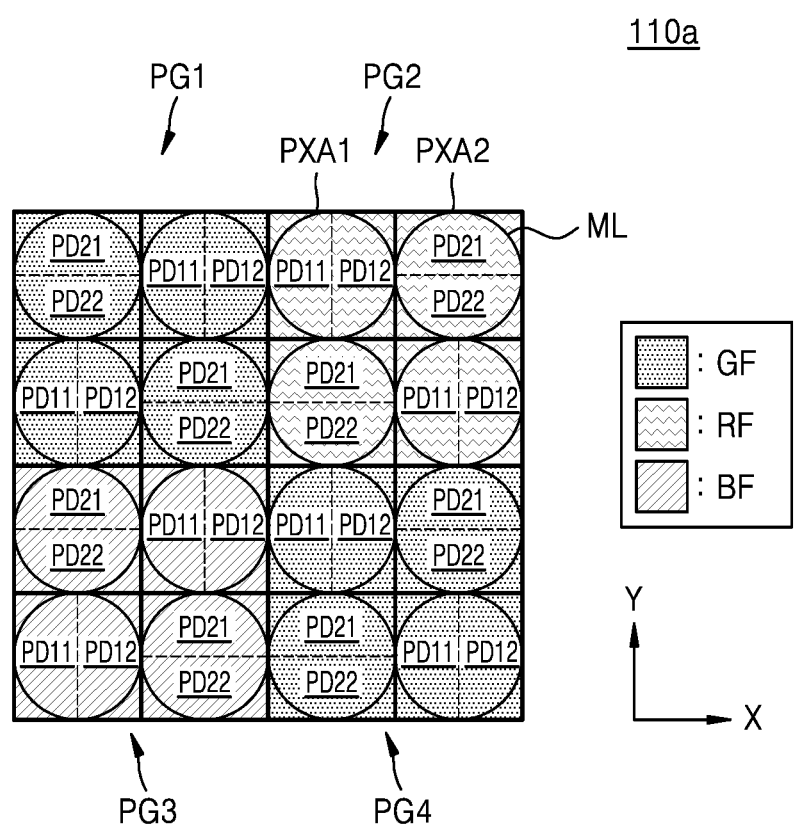
FIGS. 6A and 6B are diagrams illustrating micro lenses arranged in pixel arrays of an image sensor according to an embodiment of the inventive concept.
Figure 6B:
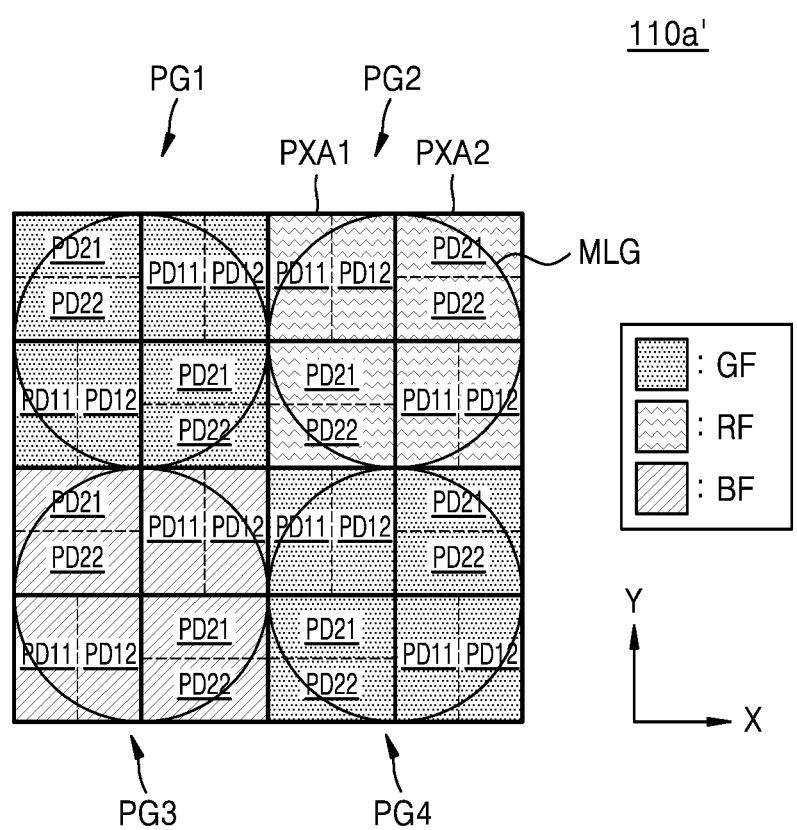

FIGS. 6A and 6B are diagrams illustrating micro lenses ML and MLG respectively arranged in the pixel arrays 110a and 110a' of an image sensor according to an embodiment of the inventive concept.

Referring to FIG. 6A, one micro lens ML may be arranged in each of pixels included in the pixel array 110a. For example, one micro lens ML may be arranged on the first AF pixel PXA1, and one micro lens ML may be arranged on the second AF pixel PXA2. More specifically, one micro lens ML may be arranged on each first AF pixel PAX1 and each second AF pixel PXA2 in the first pixel group PG1. In this case, a total of four micro lenses ML are provided in the first pixel group PG1.

Referring to FIG. 6B, one micro lens MLG may be arranged in each of pixel groups included in the pixel array 110a'. For example, one micro lens MLG may be arranged on the first pixel group PG1, and a corresponding micro lens MLG may also be arranged on each of the second to fourth pixel groups PG2 to PG4.

Referring to FIGS. 6A and 6B, an amount of charges generated by each of the first photodiode PD11 and the second photodiode PD12 arranged adjacent to each other in the first AF pixel PXA1 in the first direction X may vary according to the shape and refractive index of the micro lens ML or MLG, and an AF function in the first direction X may be performed based on the pixel signals corresponding to the amount of charges generated by each of the first photodiode PD11 and the second photodiode PD12.

In addition, an amount of charges generated by each of the first photodiode PD21 and the second photodiode PD22 arranged adjacent to each other in the second AF pixel PXA2 in the second direction Y may vary according to the shape and refractive index of the micro lens ML or MLG, and the AF function in the second direction Y may be performed based on the pixel signals corresponding to the amount of charges generated by each of the first photodiode PD21 and the second photodiode PD22.

Figure 7:
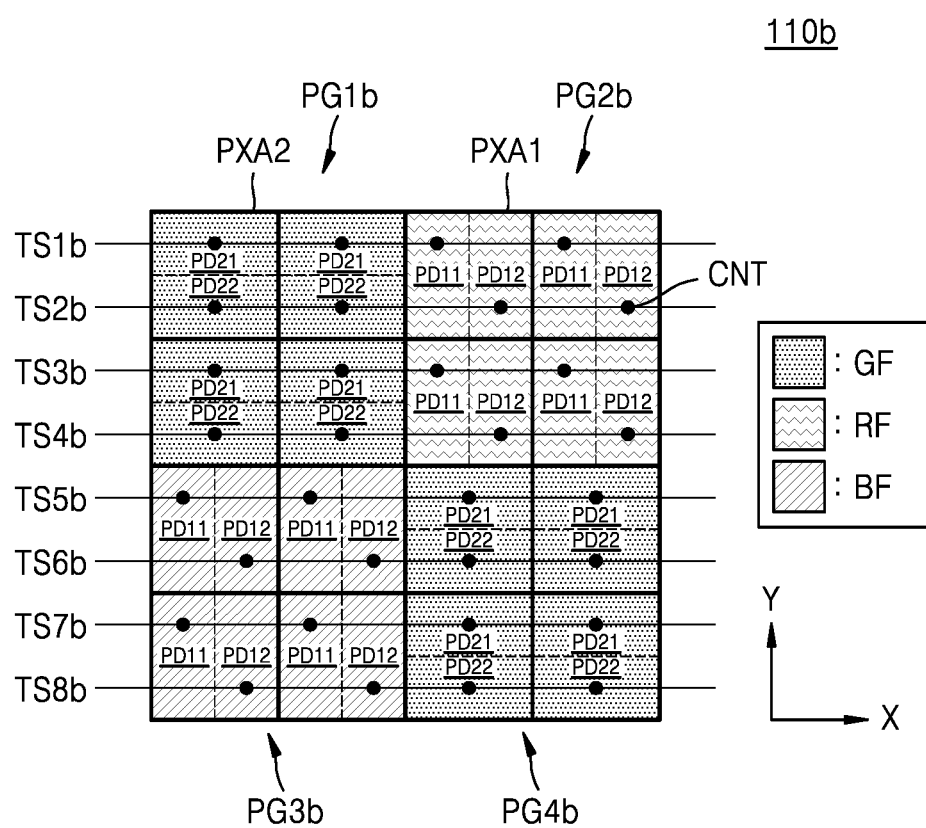
FIG. 7 is a diagram illustrating a pixel array of an image sensor according to an embodiment of the inventive concept.
Figure 8A:
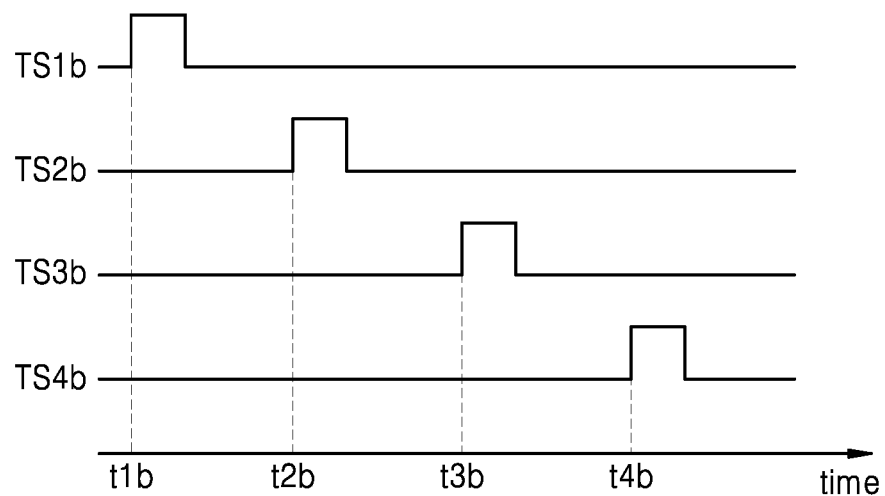
FIGS. 8A and 8B are timing diagrams illustrating transmission control signals provided to a first pixel group and a second pixel group of FIG. 7.
Figure 8B:
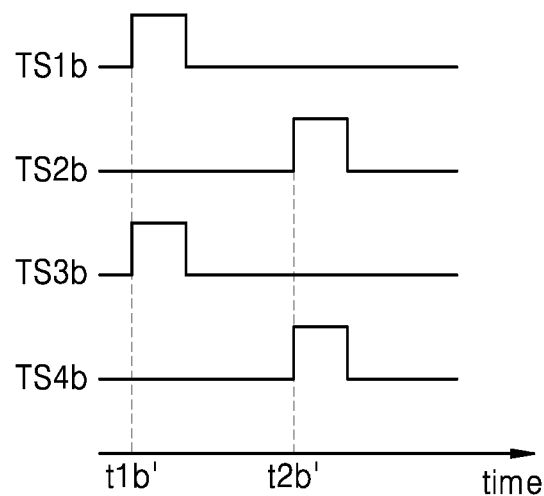

FIG. 7 is a diagram illustrating a pixel array 110b of an image sensor according to an embodiment of the inventive concept. The pixel array 110b is an example of a part of the pixel array 110 shown in FIG. 2. FIGS. 8A and 8B are timing diagrams illustrating transmission control signals provided to the first pixel group PG1b and the second pixel group PG2b of FIG. 7. In the description with reference to FIG. 7, redundant descriptions of the same reference numerals as those in FIG. 3 will be omitted.

Referring to FIG. 7, the pixel array 110b may include a plurality of pixel groups, for example, first to fourth pixel groups PG1b to PG4b. Each of the first to fourth pixel groups PG1b to PG4b may include four pixels arranged in two rows and two columns, and in an embodiment of the inventive concept, each of the first to fourth pixel groups PG1b to PG4b may include one selected from the first AF pixel PXA1 and the second AF pixel PXA2. For example, each of the first pixel group PG1b and the fourth pixel group PG4b may include four second AF pixels PXA2, and each of the second pixel group PG2b and the third pixel group PG3b may include four first AF pixels PXA1. However, the pixel array 110b is not limited thereto, and each of the first pixel group PG1b and the fourth pixel group PG4b may include four first AF pixels PXA1, and each of the second pixel group PG2b and the third pixel group PG3b may include four second AF pixels PXA2.

The first AF pixel PXA1 may include the first photodiode PD11 and the second photodiode PD12 arranged adjacent to each other in the first direction X, and the second AF pixel PXA2 may include the first photodiode PD21 and the second photodiode PD22 arranged adjacent to each other in the second direction Y. In this case, the same micro lens may be arranged on the first photodiode PD11 and the second photodiode PD12 of the first AF pixel PXA1, and the same micro lens may be arranged on the first photodiode PD21 and the second photodiode PD22 of the second AF pixel PXA2. For example, one micro lens may be arranged on each of the first AF pixel PXA1 and the second AF pixel PXA2, or, for example, one micro lens may be arranged on each of the first to fourth pixel groups PG1b to PG4b.

In an embodiment of the inventive concept, the same transmission control signal (e.g., TS1b and TS2b) may be provided to the second AF pixel PXA2 included in the first AF pixel group PG1b and the first AF pixel PXA1 included in the second AF pixel group PG2b, and the same transmission control signal (e.g., TS5b and TS6b) may be provided to the first AF pixel PXA1 included in the third AF pixel group PG3b and the second AF pixel PXA2 included in the fourth AF pixel group PG4b. For example, the second AF pixels PXA2 arranged in the first row of the first AF pixel group PG1b and the first AF pixels PXA1 arranged in the first row of the second AF pixel group PG2b may receive first and second transmission control signals TS1b and TS2b, and the second AF pixels PXA2 arranged in the second row of the first AF pixel group PG1b and the first AF pixels PXA1 arranged in the second row of the second AF pixel group PG2b may receive third and fourth transmission control signals TS3b and TS4b. In addition, for example, the first AF pixels PXA1 arranged in the first row of the third AF pixel group PG3b and the second AF pixels PXA2 arranged in the first row of the fourth AF pixel group PG4b may receive fifth and sixth transmission control signals TS5b and TS6b, and the first AF pixels PXA1 arranged in the second row of the third AF pixel group PG3b and the second AF pixels PXA2 arranged in the second row of the fourth AF pixel group PG4b may receive seventh and eighth transmission control signals TS7b and TS8b.

The first AF pixel group PG1b and the second AF pixel group PG2b may be connected to different column output lines (e.g., different from each other among the first to n-th column output lines CLO_0 to CLO_n−1 of FIG. 2), respectively, and may output pixel signals through the different column output lines, respectively. In addition, the third AF pixel group PG3b and the fourth AF pixel group PG4b may be connected to different column output lines, respectively, and may output pixel signals through the different column output lines, respectively.

The same transmission control signal may be provided to the second AF pixels PXA2 of the first AF pixel group PG1b and the first AF pixels PXA1 of the second AF pixel group PG2b, and the second AF pixels PXA2 of the first AF pixel group PG1b and the first AF pixels PXA1 of the second AF pixel group PG2b may output the pixel signals through different column output lines. In this case, the second AF pixels PXA2 of the first AF pixel group PG1b and the first AF pixels PXA1 of the second AF pixel group PG2b may simultaneously output pixel signals including AF information. Accordingly, the image sensor according to an embodiment of the inventive concept may simultaneously perform an AF operation in the first direction X and an AF operation in the second direction Y.

Referring to FIGS. 7 and 8A, during the AF operation, the first to fourth transmission control signals TS1b to TS4b may sequentially transition from a logic low level to a logic high level at first to fourth times t1b to t4b, respectively. Accordingly, the image sensor according to an embodiment of the inventive concept may perform the AF operation in the second direction Y using the pixel signals output from the second AF pixels PXA2 arranged in a first row of the first pixel group PG1b, and may perform the AF operation in the first direction X using the pixel signals output from the first AF pixels PXA1 arranged in a first row of the second pixel group PG2b. Thereafter, the image sensor according to an embodiment of the inventive concept may perform the AF operation in the second direction Y using the pixel signals output from the second AF pixels PXA2 arranged in a second row of the first pixel group PG1b, and may perform the AF operation in the first direction X using the pixel signals output from the first AF pixels PXA1 arranged in a second row of the second pixel group PG2b.

Referring to FIGS. 7 and 8B, during AF operation, first and third transmission control signals TS1b' and TS3b' may transition from the logic low level to the logic high level together at a first time t1b', and second and fourth transmission control signals TS2b' and TS4b' may transition from the logic low level to the logic high level together at a second time t2b' after the first time t1b'. Accordingly, the image sensor according to an embodiment of the inventive concept may perform the AF operation in the second direction Y using the pixel signal according to the photocharges generated by the first photodiodes PD21 of the first pixel group PG1b and the pixel signal according to photocharges generated by the second photodiodes PD22 of the first pixel group PG1b, and may perform the AF operation in the first direction X using the pixel signal according to photocharges generated by the first photodiodes PD11 of the second pixel group PG2b and the pixel signal according to photocharges generated by the second photodiodes PD12 of the second pixel group PG2b.

Figure 9:
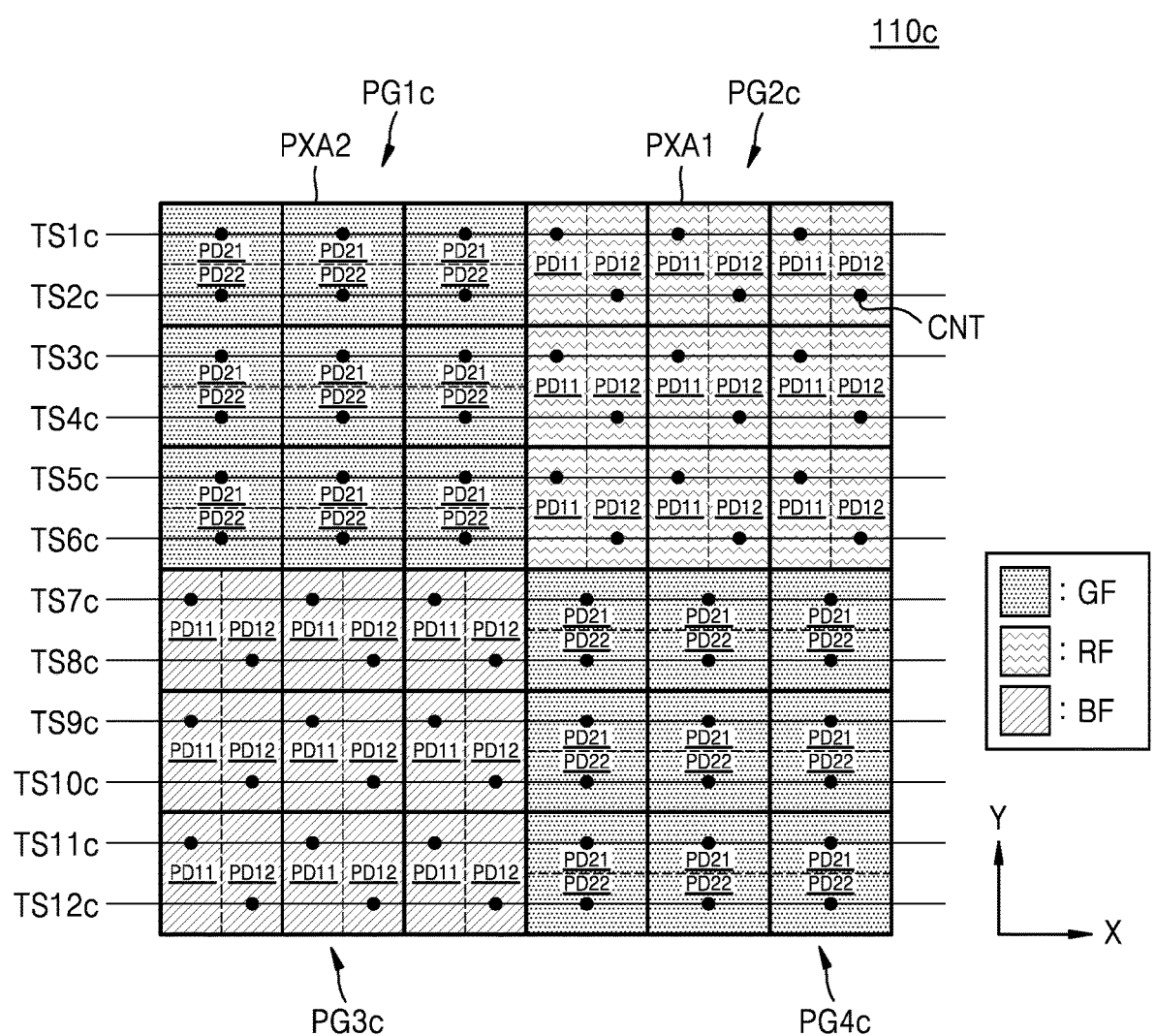
FIG. 9 is a diagram illustrating a pixel array of an image sensor according to an embodiment of the inventive concept.
Figure 10A:
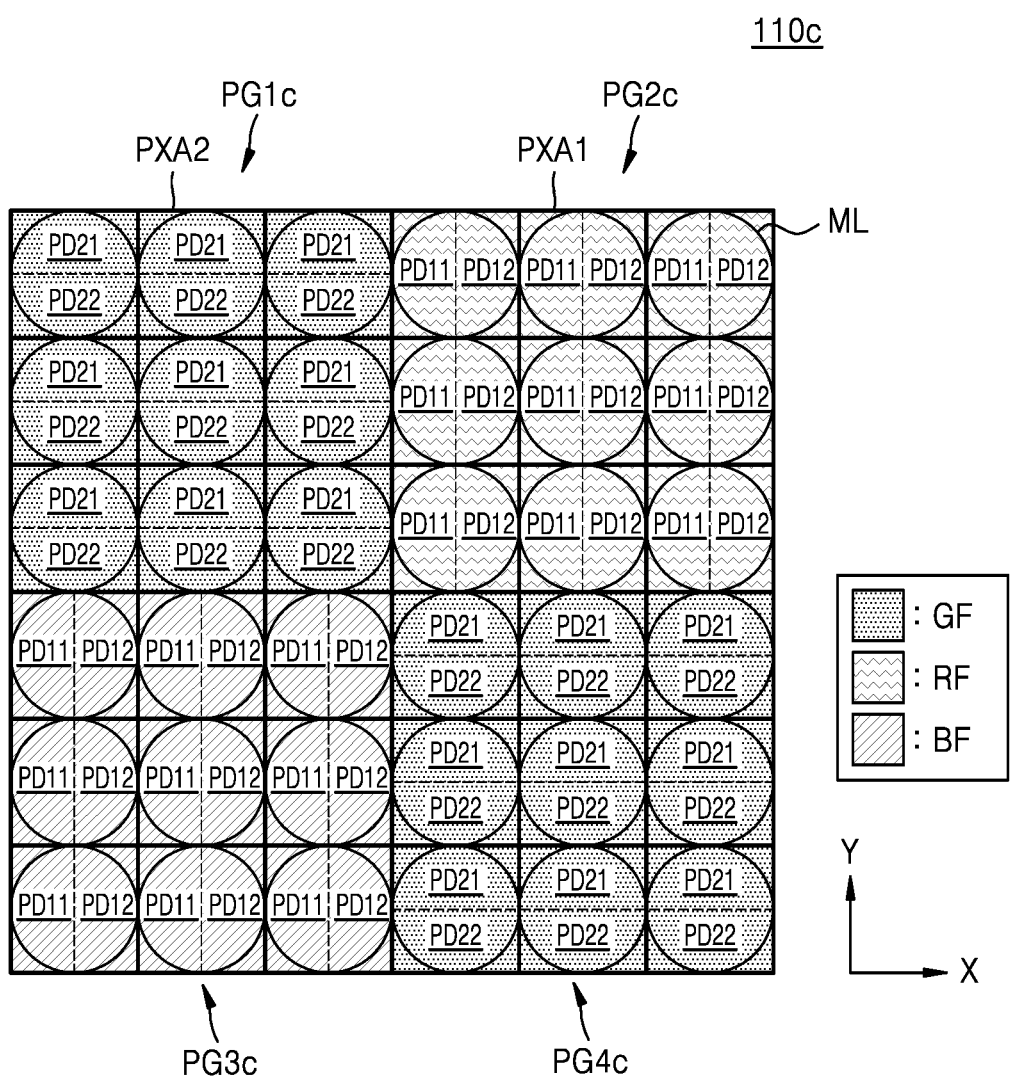
FIGS. 10A and 10B are diagrams illustrating micro lenses arranged in pixel arrays of an image sensor according to an embodiment of the inventive concept.

FIG. 9 is a diagram illustrating a pixel array 110c of an image sensor according to an embodiment of the inventive concept. For example, the pixel array 110c is an example of a part of the pixel array 110 of FIG. 2. FIGS. 10A and JOB are diagrams illustrating micro lenses M and MLGc respectively arranged in the pixel arrays 110c and 110c' of an image sensor according to an embodiment of the inventive concept. In the description with reference to FIG. 9, redundant descriptions of the same reference numerals as those in FIG. 3 will be omitted.

Referring to FIG. 9, the pixel array 110c may include a plurality of pixel groups, for example, first to fourth pixel groups PG1c to PG4c. Each of the first to fourth pixel groups PG1c to PG4c may include nine pixels arranged in three rows and three columns. In an embodiment of the inventive concept, pixels included in the same pixel group may share a floating diffusion region, but the inventive concept is not limited thereto. In addition, in an embodiment of the inventive concept, the same color filter may be arranged in pixels included in the same pixel group, but the inventive concept is not limited thereto.

In an embodiment of the inventive concept, each of the first to fourth pixel groups PG1c to PG4c may include one selected from the first AF pixel PXA1 and the second AF pixel PXA2. For example, each of the first pixel group PG1c and the fourth pixel group PG4c may include nine second AF pixels PXA2, and each of the second pixel group PG2c and the third pixel group PG3c may include nine first AF pixels PXA1. However, the pixel array 110c is not limited thereto, and each of the first pixel group PG1c and the fourth pixel group PG4c may include nine first AF pixels PXA1, and each of the second pixel group PG2c and the third pixel group PG3c may include nine second AF pixels PXA2. Alternatively, each of the first to fourth pixel groups PG1c to PG4c may include both the first AF pixel PXA1 and the second AF pixel PXA2.

In an embodiment of the inventive concept, the same transmission control signal (e.g., TS1c and TS2c) may be provided to the second AF pixel PXA2 included in the first AF pixel group PG1c and the first AF pixel PXA1 included in the second AF pixel group PG2c and the same transmission control signal (e.g., TS7c and TS8c) may be provided to the first AF pixel PXA1 included in the third AF pixel group PG3c and the second AF pixel PXA2 included in the fourth AF pixel group PG4c. For example, the second AF pixels PXA2 arranged in a first row of the first AF pixel group PG1c and the first AF pixels PXA1 arranged in a first row of the second AF pixel group PG2c may receive first and second transmission control signals TS1c and TS2c, the second AF pixels PXA2 arranged in a second row of the first AF pixel group PG1c and the first AF pixels PXA1 arranged in a second row of the second AF pixel group PG2c may receive third and fourth transmission control signals TS3c and TS4c, and the second AF pixels PXA2 arranged in a third row of the first AF pixel group PG1c and the first AF pixels PXA1 arranged in a third row of the second AF pixel group PG2c may receive fifth and sixth transmission control signals TS5c and TS6c. In addition, for example, the first AF pixels PXA1 arranged in a first row of the third AF pixel group PG3c and the second AF pixels PXA2 arranged in a first row of the fourth AF pixel group PG4c may receive seventh and eighth transmission control signals TS7c and TS8c, the first AF pixels PXA1 arranged in a second row of the third AF pixel group PG3c and the second AF pixels PXA2 arranged in a second row of the fourth AF pixel group PG4c may receive ninth and tenth transmission control signals TS9c and TS10c, and the first AF pixels PXA1 arranged in a third row of the third AF pixel group PG3c and the second AF pixels PXA2 arranged in a third row of the fourth AF pixel group PG4c may receive eleventh and twelfth transmission control signals TS11c and TS12c. A level transition time of each of the first to twelfth transmission control signals TS1c to TS12c may be modified in various ways, and the descriptions of FIGS. 8A and 8B may be equally applied.

The first AF pixel group PG1c and the second AF pixel group PG2c may be connected to different column output lines (e.g., different from each other among the first to n-th column output lines CLO_0 to CLO_n−1 of FIG. 2), respectively, and may output pixel signals through the different column output lines, respectively. In addition, the third AF pixel group PG3c and the fourth AF pixel group PG4c may be connected to different column output lines, respectively, and may output pixel signals the through different column output lines, respectively.

The same transmission control signal may be provided to the second AF pixels PXA2 of the first AF pixel group PG1c and the first AF pixels PXA1 of the second AF pixel group PG2c, and the second AF pixels PXA2 of the first AF pixel group PG1c and the first AF pixels PXA1 of the second AF pixel group PG2c may output the pixel signals through different column output lines. In this case, the second AF pixels PXA2 of the first AF pixel group PG1c and the first AF pixels PXA1 of the second AF pixel group PG2c may simultaneously output pixel signals including AF information. Accordingly, the image sensor according to an embodiment of the inventive concept may simultaneously perform an AF operation in the first direction X and an AF operation in the second direction Y.

Referring to FIG. 10A, one micro lens ML may be arranged in each of pixels included in the pixel array 110c. For example, one micro lens ML may be arranged on the first AF pixel PXA1, and one micro lens ML may be arranged on the second AF pixel PXA2. In other words, the first pixel group PG1c may include nine micro lenses ML.

Figure 10B:
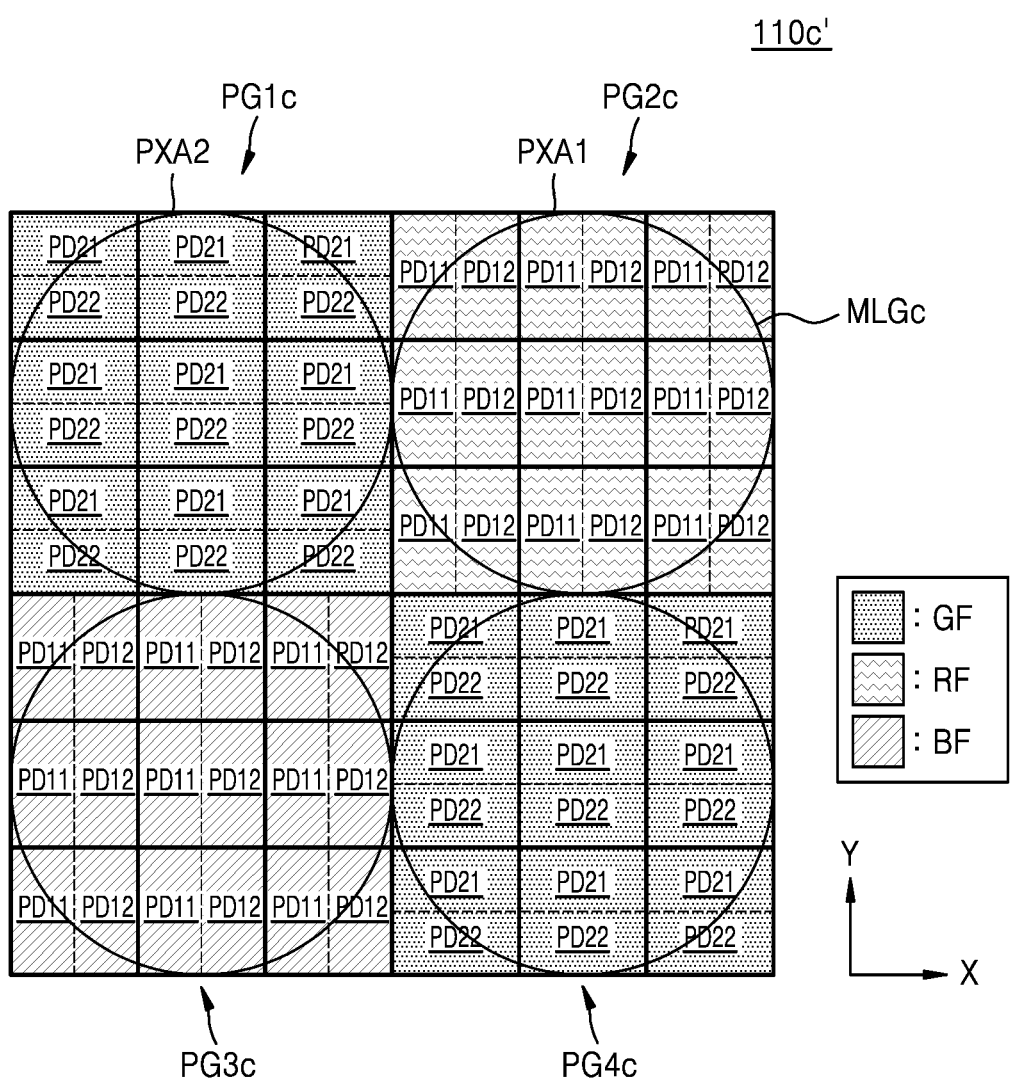

Referring to FIG. 10B, one micro lens MLGc may be arranged in each of pixel groups included in the pixel array 110c'. For example, one micro lens MLGc may be arranged on the first pixel group PG1c, and one micro lens MLGc may be arranged on each of the second to fourth pixel groups PG2c to PG4c.

Figure 11:
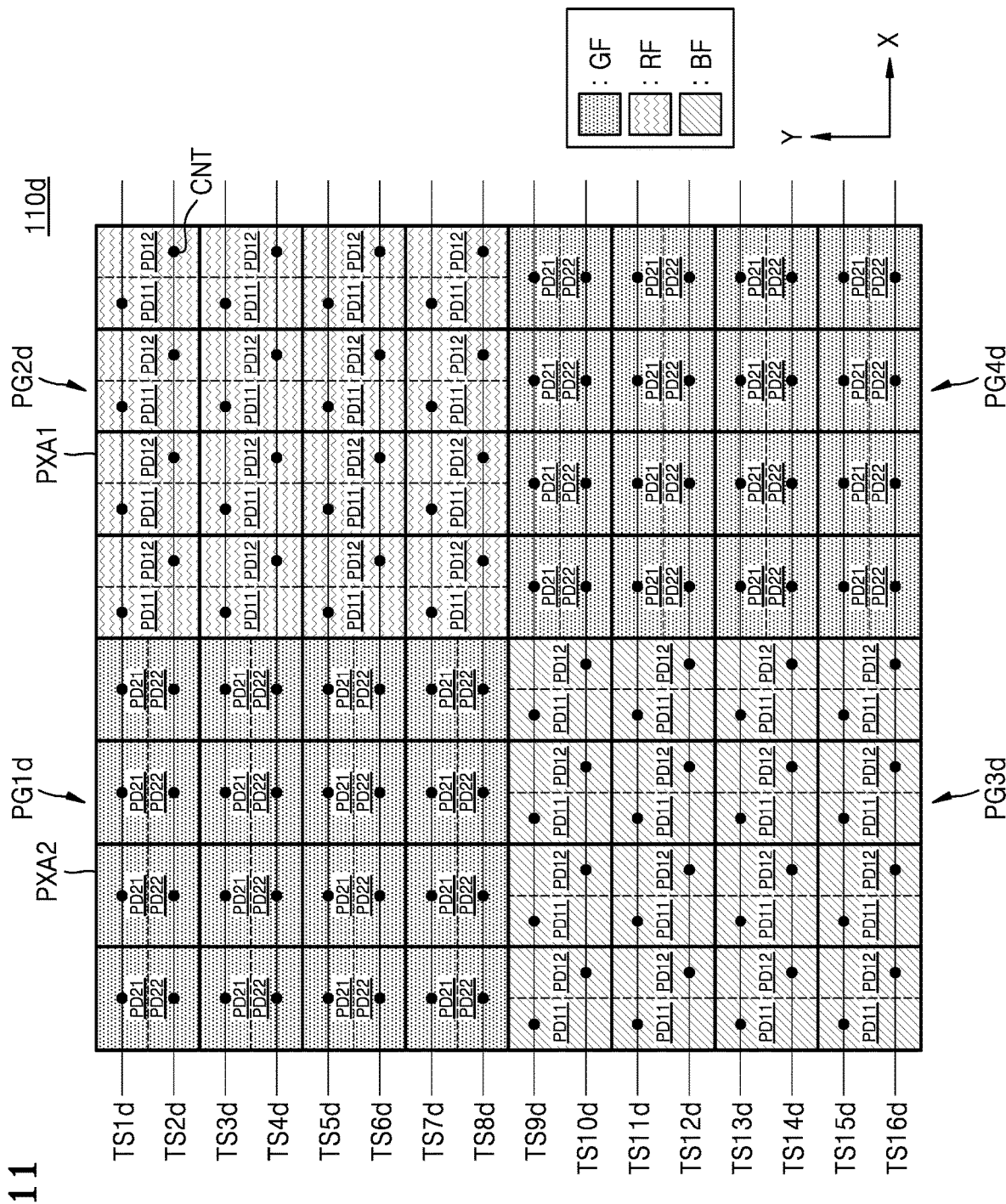
FIG. 11 is a diagram of a pixel array of an image sensor according to an embodiment of the inventive concept.
Figure 12A:
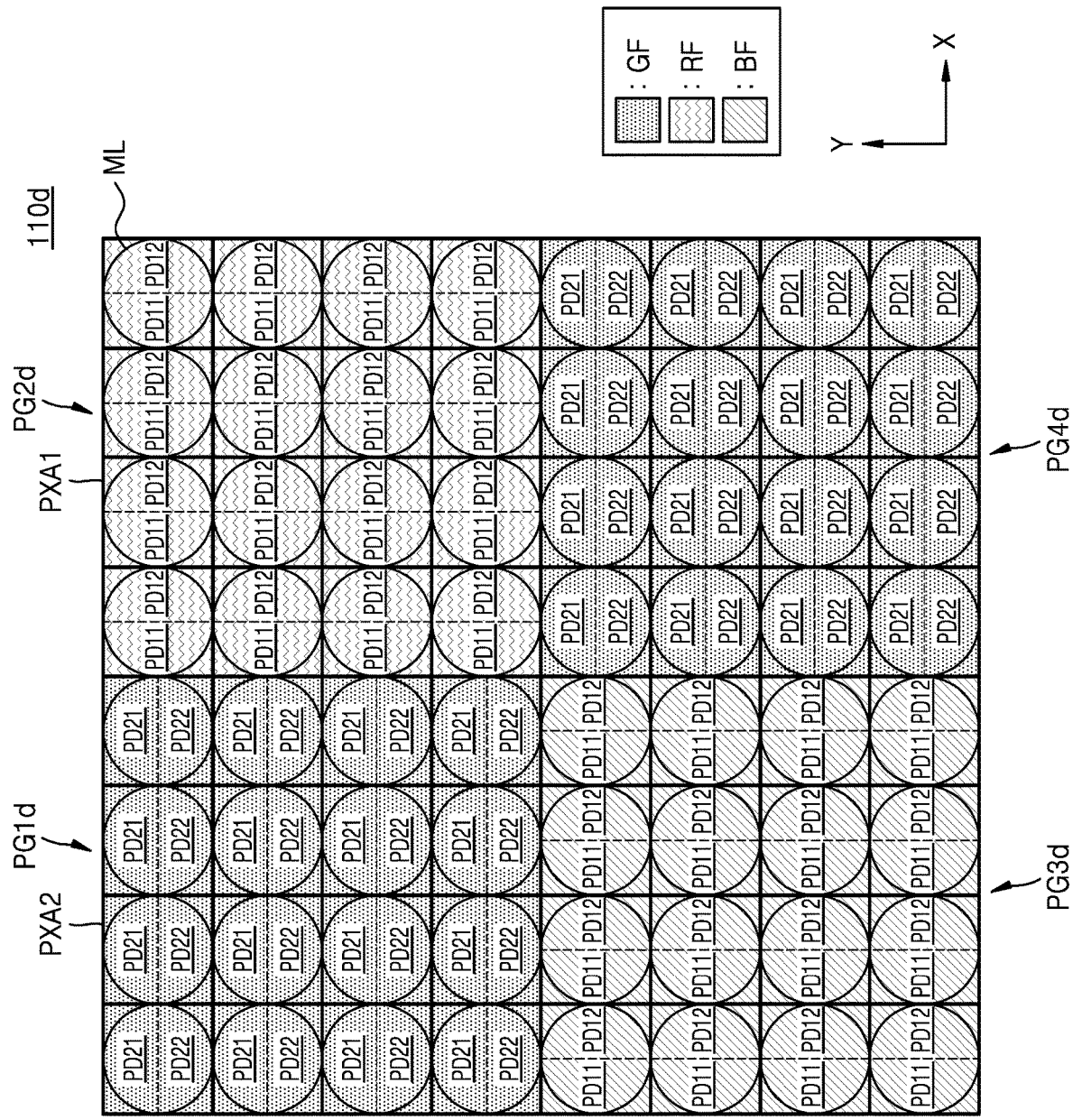
FIGS. 12A, 12B and 12C are diagrams illustrating micro lenses arranged in pixel arrays of an image sensor according to an embodiment of the inventive concept.
Figure 12B:
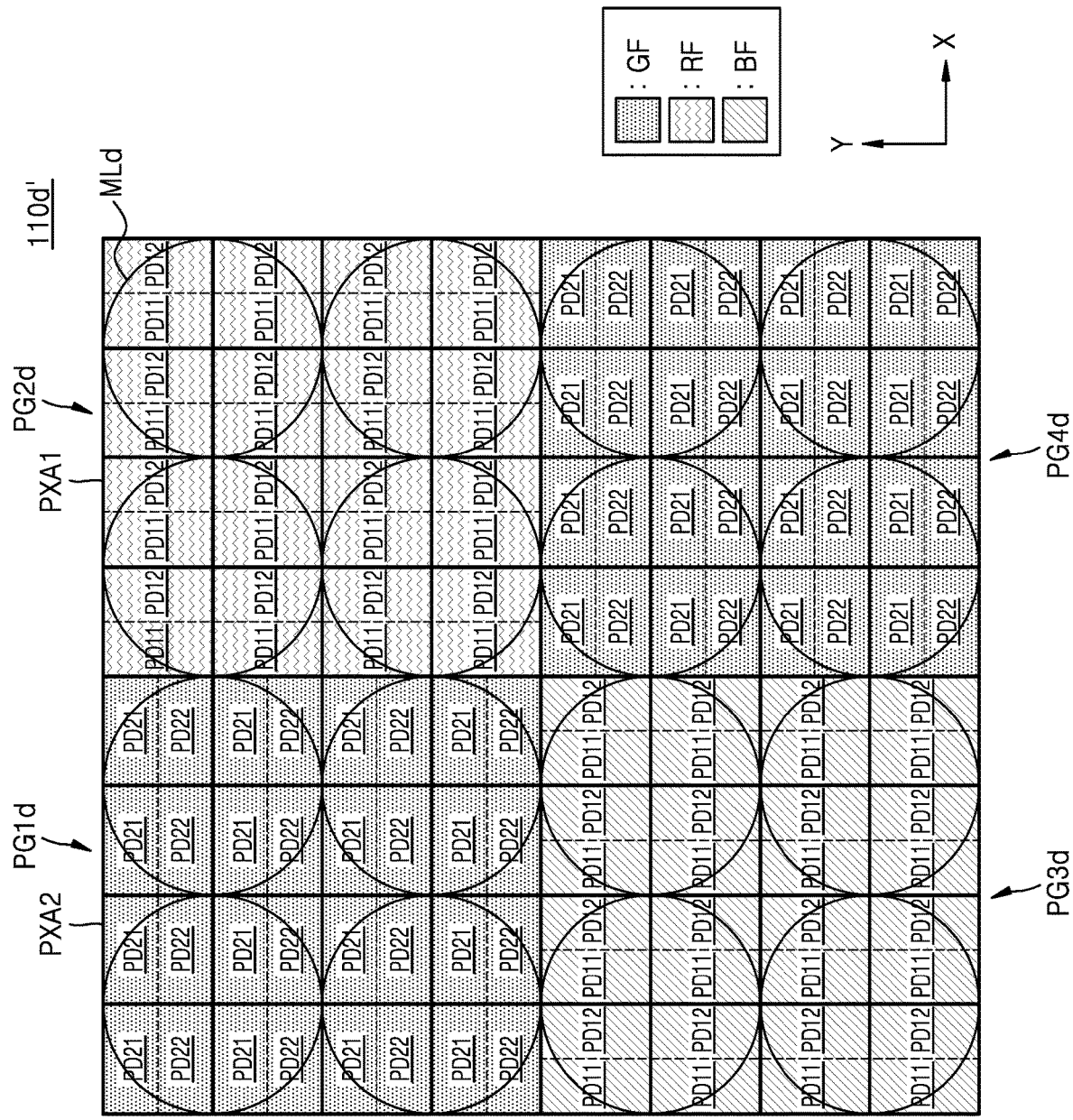
Figure 12C:
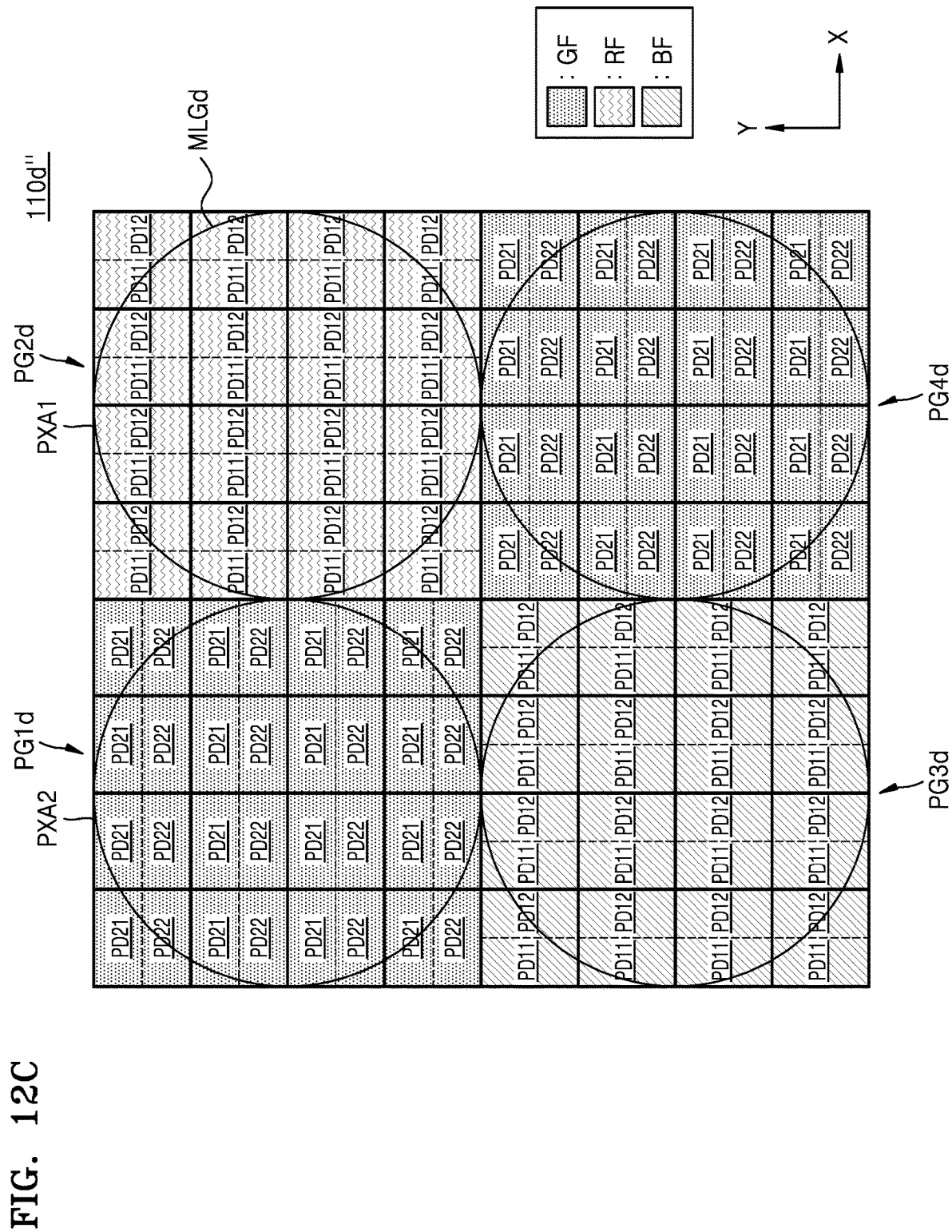

FIG. 11 is a diagram illustrating a pixel array 110d of an image sensor according to an embodiment of the inventive concept. For example, the pixel array 110d is an example of a part of the pixel array 110 of FIG. 2. FIGS. 12A to 12C are diagrams illustrating micro lenses M, MU, and MLGd respectively arranged in pixel arrays 110d, 110d', and 110d" of an image sensor according to an embodiment of the inventive concept. In the description with reference to FIG. 11, redundant descriptions of the same reference numerals as those in FIG. 3 will be omitted.

Referring to FIG. 11, the pixel array 110d may include a plurality of pixel groups, for example, first to fourth pixel groups PG1d to PG4d. Each of the first to fourth pixel groups PG1d to PG4d may include sixteen pixels arranged in four rows and four columns. In an embodiment of the inventive concept, pixels included in the same pixel group may share a floating diffusion region, but the inventive concept is not limited thereto. In addition, in an embodiment of the inventive concept, the same color filter may be arranged in pixels included in the same pixel group, but the inventive concept is not limited thereto.

Each of the first to fourth pixel groups PG1d to PG4d may include one selected from the first AF pixel PXA1 and the second AF pixel PXA2. For example, each of the first pixel group PG1d and the fourth pixel group PG4d may include sixteen second AF pixels PXA2, and each of the second pixel group PG2d and the third pixel group PG3d may include sixteen first AF pixels PXA1. However, the pixel array 110d according to an embodiment of the inventive concept is not limited thereto, and each of the first pixel group PG1d and the fourth pixel group PG4d may include sixteen first AF pixels PXA1, and each of the second pixel group PG2d and the third pixel group PG3d may include sixteen second AF pixels PXA2. Alternatively, each of the first to fourth pixel groups PG1d to PG4d may include both the first AF pixel PXA1 and the second AF pixel PXA2.

In an embodiment of the inventive concept, the same transmission control signal (e.g., TS1d and TS2d) may be provided to the second AF pixel PXA2 included in the first AF pixel group PG1d and the first AF pixel PXA1 included in the second AF pixel group PG2d, and the same transmission control signal (e.g., TS9d and TS10d) may be provided to the first AF pixel PXA1 included in the third AF pixel group PG3d and the second AF pixel PXA2 included in the fourth AF pixel group PG4d. For example, the second AF pixels PXA2 arranged in a first row of the first AF pixel group PG1d and the first AF pixels PXA1 arranged in a first row of the second AF pixel group PG2d may receive first and second transmission control signals TS1d and TS2d, the second AF pixels PXA2 arranged in a second row of the first AF pixel group PG1d and the first AF pixels PXA1 arranged in a second row of the second AF pixel group PG2d may receive third and fourth transmission control signals TS3d and TS4d, the second AF pixels PXA2 arranged in a third row of the first AF pixel group PG1d and the first AF pixels PXA1 arranged in a third row of the second AF pixel group PG2d may receive fifth and sixth transmission control signals TS5d and TS6d, and the second AF pixels PXA2 arranged in a fourth row of the first AF pixel group PG1d and the first AF pixels PXA1 arranged in a fourth row of the second AF pixel group PG2d may receive seventh and eighth transmission control signals TS7d and TS8d. In addition, for example, the first AF pixels PXA1 arranged in a first row of the third AF pixel group PG3d and the second AF pixels PXA2 arranged in a first row of the fourth AF pixel group PG4d may receive ninth and tenth transmission control signals TS9d and TS10d, the first AF pixels PXA1 arranged in a second row of the third AF pixel group PG3d and the second AF pixels PXA2 arranged in a second row of the fourth AF pixel group PG4d may receive eleventh and twelfth transmission control signals TS11d and TS12d, the first AF pixels PXA1 arranged in a third row of the third AF pixel group PG3d and the second AF pixels PXA2 arranged in a third row of the fourth AF pixel group PG4d may receive thirteenth and fourteenth transmission control signals TS13d and TS14d, and the first AF pixels PXA1 arranged in a fourth row of the third AF pixel group PG3d and the second AF pixels PXA2 arranged in a fourth row of the fourth AF pixel group PG4d may receive fifteenth and sixteenth transmission control signals TS15d and TS16d. A level transition time of each of the first to sixteenth transmission control signals TS1d to TS16d may be modified in various ways, and the descriptions of FIGS. 8A and 8B may be equally applied.

The first AF pixel group PG1d and the second AF pixel group PG2d may be connected to different column output lines (e.g., different from each other among the first to n-th column output lines CLO_0 to CLO_n−1 of FIG. 2), respectively, and may output pixel signals through the different column output lines, respectively. In addition, the third AF pixel group PG3d and the fourth AF pixel group PG4d may be connected to different column output lines, respectively, and may output pixel signals through the different column output lines, respectively.

The same transmission control signal may be provided to the second AF pixels PXA2 of the first AF pixel group PG1d and the first AF pixels PXA1 of the second AF pixel group PG2d, and the second AF pixels PXA2 of the first AF pixel group PG1d and the first AF pixels PXA1 of the second AF pixel group PG2d may output the pixel signals through different column output lines. In this case, the second AF pixels PXA2 of the first AF pixel group PG1d and the first AF pixels PXA1 of the second AF pixel group PG2d may simultaneously output pixel signals including AF information. Accordingly, the image sensor according to an embodiment of the inventive concept may simultaneously perform an AF operation in the first direction X and an AF operation in the second direction Y.

Referring to FIG. 12A, one micro lens ML may be arranged in each of pixels included in the pixel array 110d. For example, one micro lens ML may be arranged on the first AF pixel PXA1, and one micro lens ML may be arranged on the second AF pixel PXA2.

Referring to FIG. 12B, one micro lens MLd may be arranged on four pixels arranged in two rows and two columns among pixels included in the pixel array 110d'. For example, four micro lenses MLd may be arranged on the first pixel group PG1d, and four micro lenses MLd may also be arranged on each of the second to fourth pixel groups PG2d to PG4d. In other words, the first pixel group PG1d may include 16 micro lenses ML.

Referring to FIG. 12C, one micro lens MLGd may be arranged in each of pixel groups included in the pixel array 110d". For example, one micro lens MLGd may be arranged on the first pixel group PG1d, and a micro lens MLGd may be arranged on each of the second to fourth pixel groups PG2d to PG4d.

Figure 13:
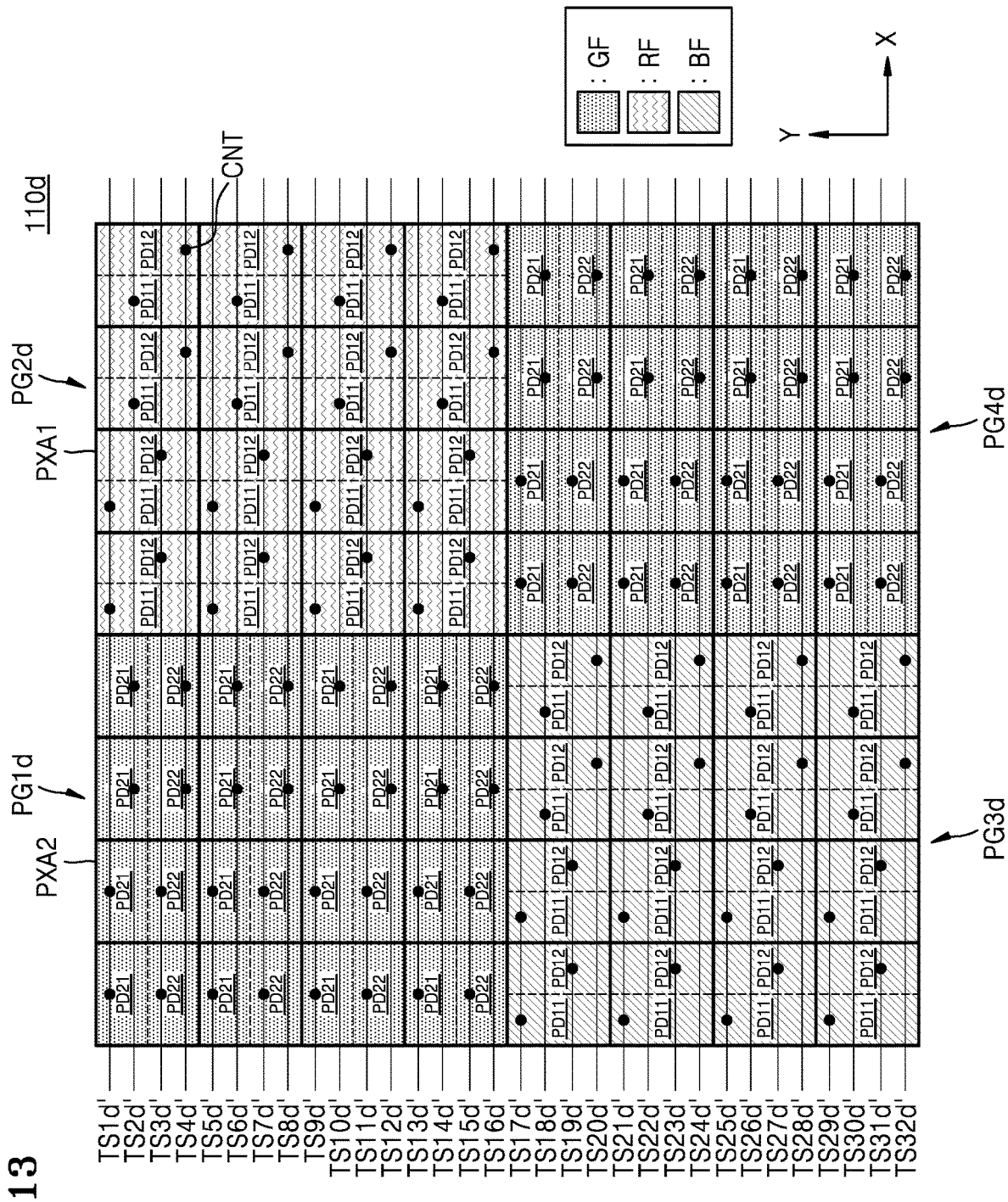
FIG. 13 is a diagram of a pixel array of an image sensor according to an embodiment of the inventive concept.

FIG. 13 is a diagram illustrating a pixel array 110d of an image sensor according to an embodiment of the inventive concept. For example, the pixel array 110d is an example of a part of the pixel array 110 shown in FIG. 2. In the description of FIG. 13, redundant descriptions of the same reference numerals as in FIGS. 3 and 11 will be omitted.

Referring to FIG. 13, in an embodiment of the inventive concept, the same transmission control signal may be provided to the second AF pixel PXA2 included in the first AF pixel group PG1d and the first AF pixel PXA1 included in the second AF pixel group PG2d, and the same transmission control signal may be provided to the first AF pixel PXA1 included in the third AF pixel group PG3d and the second AF pixel PXA2 included in the fourth AF pixel group PG4d.

First to sixteenth transmission control signals TS1d' to TS16d' may be provided to the first AF pixel group PG1d and the second AF pixel group PG2d, and seventeenth to thirty-second transmission control signals TS17d' to TS32d' may be provided to the third AF pixel group PG3d and the fourth AF pixel group PG4d. In an embodiment of the inventive concept, two second AF pixels PXA2 of the first AF pixel group PG1d and two first AF pixels PXA1 of the second AF pixel group PG2d may receive the same transmission control signal. For example, the two second AF pixels PXA2 arranged in first and second columns and a first row of the first AF pixel group PG1d and the two first AF pixels PXA1 arranged in first and second columns and a first row of the second AF pixel group PG2d may receive the same first and third transmission control signals TS1d' and TS3d'.

The same transmission control signal may be provided to the second AF pixels PXA2 of the first AF pixel group PG1d and the first AF pixels PXA1 of the second AF pixel group PG2d, and the second AF pixels PXA2 of the first AF pixel group PG1d and the first AF pixels PXA1 of the second AF pixel group PG2d may output the pixel signals through different column output lines. In this case, the second AF pixels PXA2 of the first AF pixel group PG1d and the first AF pixels PXA1 of the second AF pixel group PG2d may simultaneously output pixel signals including AF information. Accordingly, the image sensor according to an embodiment of the inventive concept may simultaneously perform an AF operation in the first direction X and an AF operation in the second direction Y.

Figure 14:
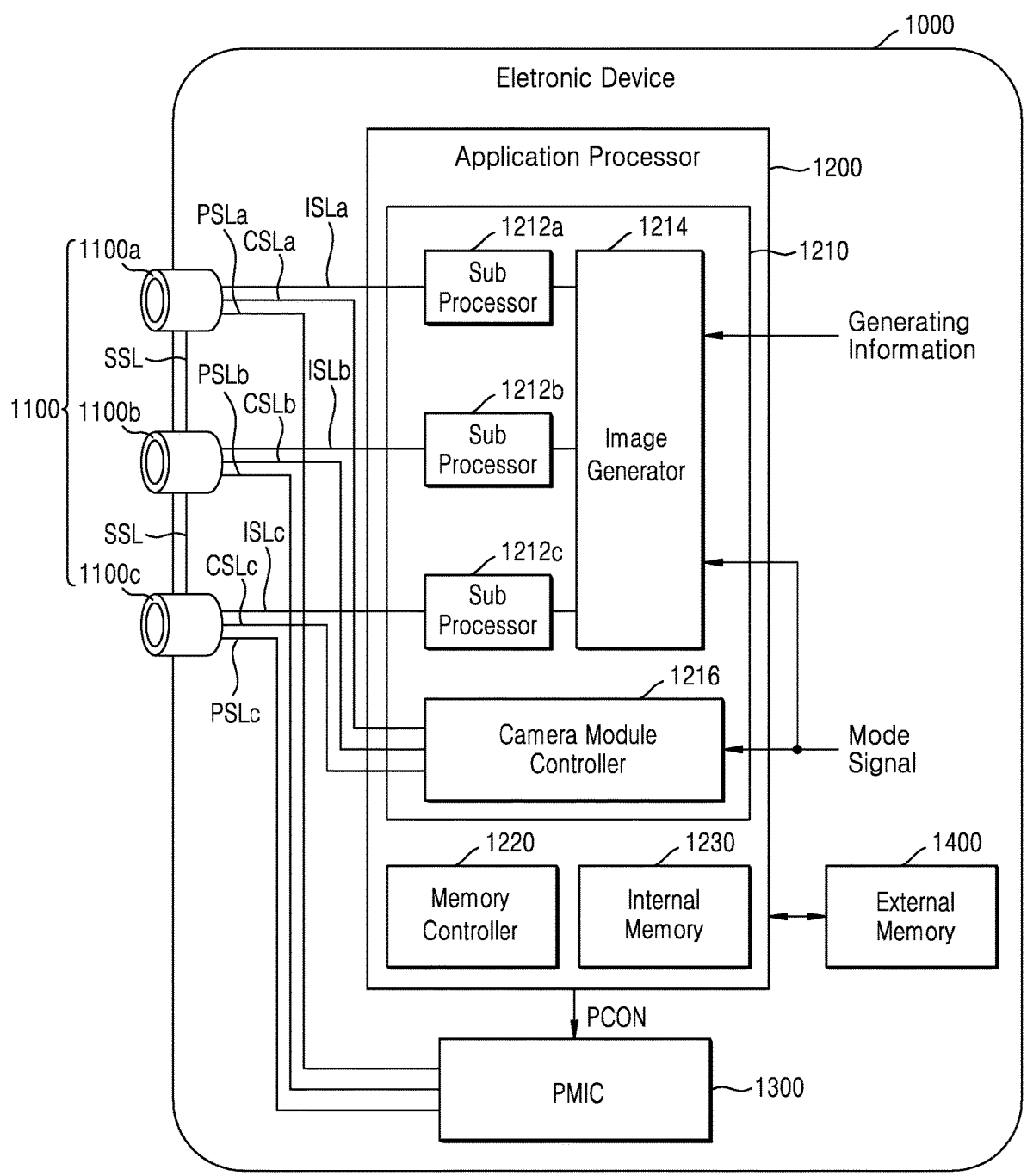
FIG. 14 is a block diagram of an electronic device including a multi camera module.
Figure 15:
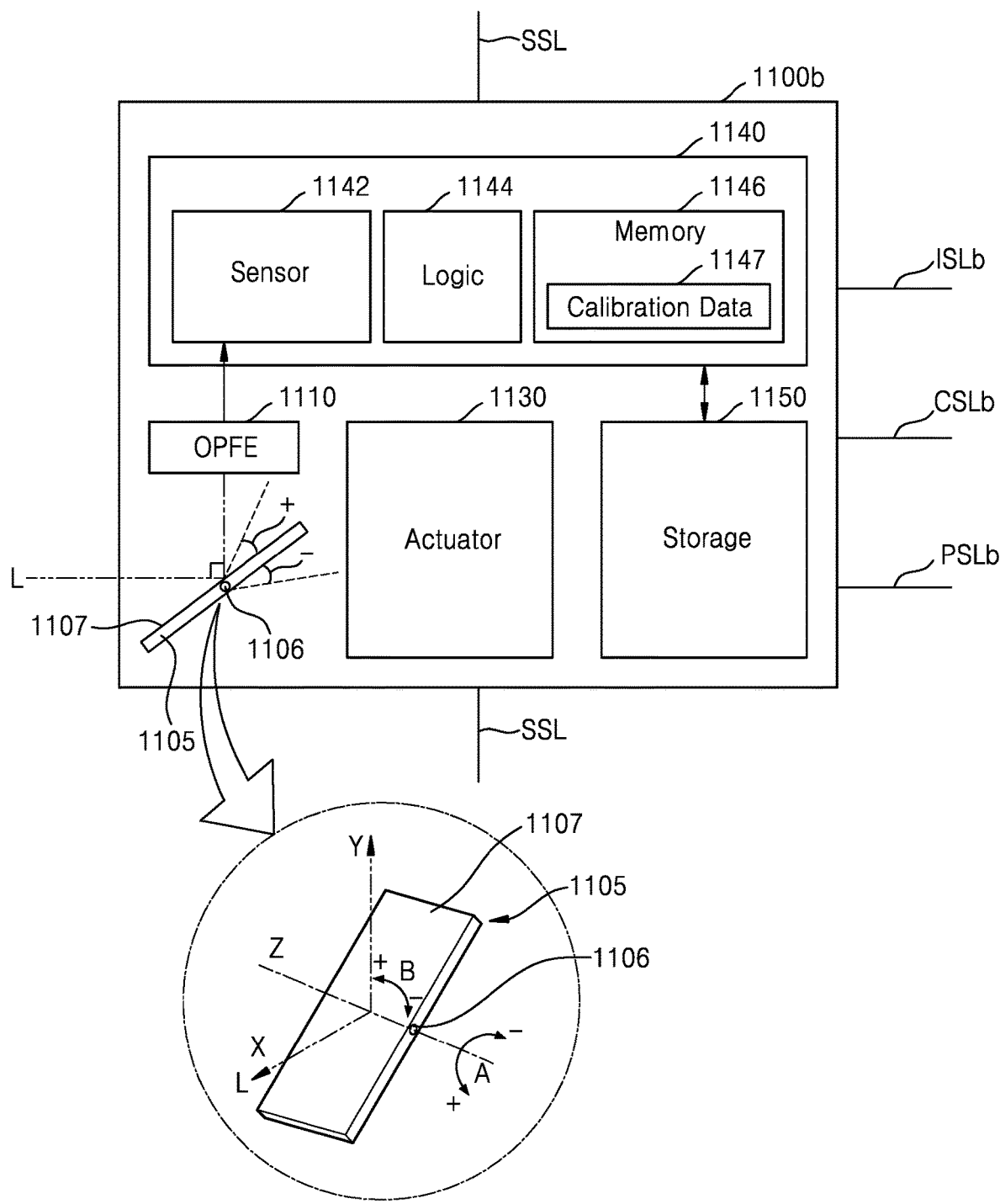
FIG. 15 is a detailed block diagram of a camera module shown in FIG. 14.

FIG. 14 is a block diagram of an electronic device including a multi camera module. FIG. 15 is a detailed block diagram of the camera module shown in FIG. 14. Although a detailed configuration of a camera module 1100b is described in FIG. 15, according to embodiments of the inventive concept, the following descriptions of the camera module 1100b may also be applied to other camera modules 1100a and 1100c.

Referring to FIG. 14, the electronic device 1000 may include a camera module group 1100, an application processor 1200, a power management integrated circuit (IC) (PMIC) 1300, and an external memory 1400. The camera module group 1100 may include a plurality of camera modules 1100a, 1100b, and 1100c. Although FIG. 14 shows an embodiment in which three camera modules 1100a, 1100b, and 1100c are arranged, the inventive concept is not limited thereto.

Referring to FIGS. 14 and 15, the camera module 1100b may include a prism 1105, an optical path folding element (hereinafter, referred to as "OPFE") 1110, an actuator 1130, an image sensing device 1140, and a storage 1150.

The prism 1105, which includes a reflecting plane 1107 formed of a light-reflecting material, may change a path of light L incident from outside. The OPFE 1110 may include, for example, optical lenses constructed in m (wherein m is a natural number) groups. The actuator 1130 may shift the OPFE 1110 or the optical lenses (hereinafter, referred to as optical lenses) to a specific position.

The image sensing device 1140 may include an image sensor 1142, a control logic 1144, and a memory 1146 that includes calibration data 1147. The image sensor 1142 may sense an image of a sensing object by using the light L provided through the optical lenses. The image sensor 1142 may be the image sensor 100 described with reference to FIGS. 1 and 2, and may include the pixel arrays 110*a*, 110*a*', 110*b*, 110*c*, 110*c*', 110*d*, 110*d*', 110*d*" described with reference to FIGS. 3 through 13.

The control logic 1144 may control all operations of the camera module 1100*b*. For example, the control logic 1144 may control operations of the camera module 1100*b* in response to a control signal provided through a control signal line CSLb.

In an example embodiment of the inventive concept, a camera module (e.g., the camera module 1100*b*) among the plurality of camera modules 1100*a*, 1100*b*, and 1100*c* may be a camera module having a folded lens shape, which includes the prism 1105 and the OPFE 1110 described above, and the other camera modules (e.g., the camera modules 1100*a* and 1100*c*) may be camera modules having a vertical shape, in which the prism 1105 and the OPFE 1110 are not included, but the inventive concept is not limited thereto.

In an example embodiment of the inventive concept, a camera module (e.g., the camera module 1100*c*) among the plurality of camera modules 1100*a*, 1100*b*, and 1100*c* may include, for example, a depth camera having a vertical depth, which extracts depth information by using an infrared ray (IR). In this case, the application processor 1200 may generate a three-dimensional (3D) image depth by merging an image data value provided from the depth camera and an image data value provided from another camera module (e.g., the camera module 1100*a* or 1100*c*).

In an example embodiment of the inventive concept, at least two camera modules (e.g., the camera modules 1100*a* and 1100*b*) among the plurality of camera modules 1100*a*, 1100*b*, and 1100*c* may have different fields of view. In this case, optical lenses of the at least two camera modules (e.g., the camera modules 1100*a* and 1100*b*) among the plurality of camera modules 1100*a*, 1100*b*, and 1100*c* may be different from one another, but the inventive concept is not limited thereto.

Furthermore, in an example embodiment of the inventive concept, fields of view of the plurality of camera modules 1100*a*, 1100*b*, and 1100*c* may be different from one another. In this case, optical lenses respectively included in the plurality of camera modules 1100*a*, 1100*b*, and 1100*c* may be different from one another, but the inventive concept is not limited thereto.

In an example embodiment of the inventive concept, the plurality of camera modules 1100*a*, 1100*b*, and 1100*c* may be physically separated from one another. In other words, a sensing area of one image sensor 1142 is not used in division by the plurality of camera modules 1100*a*, 1100*b*, and 1100*c*, and the image sensor 1142 may be individually arranged in each of the plurality of camera modules 1100*a*, 1100*b*, and 1100*c*.

Referring again to FIG. 14, the application processor 1200 may include an image processing device 1210, a memory controller 1220, and an internal memory 1230. The application processor 1200 may be implemented separate from the plurality of camera modules 1100*a*, 1100*b*, and 1100*c*. For example, the application processor 1200 and the plurality of camera modules 1100*a*, 1100*b*, and 1100*c* may be implemented in separation from each other as separate semiconductor chips.

The image processing device 1210 may include a plurality of sub image processors 1212*a*, 1212*b*, and 1212*c*, an image generator 1214, and a camera module controller 1216.

The image processing device 1210 may include the plurality of sub image processors 1212*a*, 1212*b*, and 1212*c* in a number corresponding to the number of the plurality of camera modules 1100*a*, 1100*b*, and 1100*c*.

Image data values respectively generated by the camera modules 1100*a*, 1100*b*, and 1100*c* may be provided to corresponding sub image processors 1212*a*, 1212*b*, and 1212*c* through image signal lines ISLa, ISLb, and ISLc that are separated from one another. For example, the image data value provided by the camera module 1100*a* may be provided to the sub image processor 1212*a* through the image signal line ISLa, the image data value provided by the camera module 1100*b* may be provided to the sub image processor 1212*b* through the image signal line ISLb, and the image data value provided by the camera module 1100*c* may be provided to the sub image processor 1212*c* through the image signal line ISLc. Transmission of the image data values may be performed, for example, by using a mobile industry processor interface (MIPI)-based camera serial interface (CSI), but embodiments of the inventive concept are not limited thereto.

The image data values provided to the sub image processors 1212*a*, 1212*b*, and 1212*c* may be provided to the image generator 1214. The image generator 1214 may generate an output image by using image data provided by each of the sub image processors 1212*a*, 1212*b*, and 1212*c* according to image generating information or a mode signal.

For example, the image generator 1214 may generate the output image by merging at least some of the image data values, which are generated from the camera modules 1100*a*, 1100*b*, and 1100*c* having different fields of view, according to the image generating information or the mode signal. In addition, the image generator 1214 may generate the output image by selecting any one of the image data values, which are generated from the camera modules 1100*a*, 1100*b*, and 1100*c* having different fields of view, according to the image generating information or the mode signal.

The camera module controller 1216 may provide a control signal to each of the camera modules 1100*a*, 1100*b*, and 1100*c*. The control signals generated by the camera module controller 1216 may be provided to corresponding camera modules 1100*a*, 1100*b*, and 1100*c* through the control signal lines CSLa, CSLb, and CSLc that are separated from one another.

In an example embodiment of the inventive concept, the control signal provided by the camera module controller 1216 to each of the camera modules 1100*a*, 1100*b*, and 1100*c* may include a sync enable signal. For example, when the camera module 1100*b* is a master camera, and the camera modules 1100*a* and 1100*c* are slave cameras, the camera module controller 1216 may transmit the sync enable signal to the camera module 1100*b*. The camera module 1100*b* having received the sync enable signal may generate a sync signal based on the received sync enable signal, and provide the generated sync signal to the camera modules 1100*a* and 1100*c* via the sync enable signal line SSL. The camera module 1100*b* and the camera modules 1100*a* and 1100*c* may be synchronized to the sync signal, and transmit the image data to the application processor 1200.

The application processor 1200 may store the received image data values (e.g., encoded data) in the internal memory 1230 or the external memory 1400 outside the application processor 1200, and then, may read and decode the encoded data from the internal memory 1230 or the external memory 1400 and display an image that is generated based on the decoded image values. For example, corresponding sub processors among the plurality of sub processors 1212a, 1212b, and 1212c of the image processing device 1210 may perform decoding, and may also perform encoding with respect to the decoded image values.

The PMIC 1300 may provide power (e.g., the power voltage) to each of the plurality of camera modules 1100a, 1100b, and 1100c. For example, in response to a power control signal PCON from the application processor 1200, the PMIC 1300 may provide a first power to the camera module 1100a through the power signal line PSLa, provide a second power to the camera module 1100b through the power signal line PSLb, and provide a third power to the camera module 1100c through the power signal line PSLc.

While the inventive concept has been particularly shown and described with reference to embodiments thereof, it will be understood that various changes in form and details may be made thereto without departing from the spirit and scope of the inventive concept as set forth in the following claims.

What is claimed is:

1. An image sensor, comprising:
a pixel array comprising a plurality of pixels arranged in a plurality of rows and a plurality of columns; and
transmission control lines configured to provide transmission control signals to the pixel array,
wherein the plurality of pixels comprises a first pixel, a second pixel, and a third pixel arranged in a same row of the pixel array,
wherein the first pixel comprises a first photodiode and a second photodiode arranged in a first direction, wherein the first photodiode of the first pixel is connected to a first transmission control line, and wherein the second photodiode of the first pixel is connected to a second transmission control line,
wherein the second pixel adjacent to the first pixel comprises a first photodiode and a second photodiode arranged in the first direction, wherein the first photodiode of the second pixel is connected to a third transmission control line, and wherein the second photodiode of the second pixel is connected to a fourth transmission control line, and
wherein the third pixel comprises a first photodiode and a second photodiode arranged in a second direction perpendicular to the first direction, wherein the first photodiode of the third pixel is connected to the first transmission control line, and wherein the second photodiode of the third pixel is connected to the second transmission control line.

2. The image sensor of claim 1, wherein the first pixel and the second pixel are connected to a first column line, and the third pixel is connected to a second column line.

3. The image sensor of claim 1, wherein one micro lens is arranged in each of the plurality of pixels.

4. The image sensor of claim 1, wherein the first pixel and the second pixel comprise a first color filter respectively, and the third pixel comprises a second color filter.

5. The image sensor of claim 1, wherein the first pixel and the second pixel comprise a green color filter, and the third pixel comprises a blue color filter or a red color filter.

6. The image sensor of claim 1, further comprising one pixel group of sixteen pixels arranged in four rows and four columns, including the first pixel and the second pixel.

7. The image sensor of claim 1, wherein the first pixel and the second pixel share a floating diffusion region.

8. An image sensor, comprising:
a pixel array comprising a first pixel group and a second pixel group comprising a plurality of pixels arranged in a plurality of rows and a plurality of columns; and
transmission control lines configured to provide transmission control signals to the pixel array,
wherein the first pixel group comprises a first pixel and a second pixel arranged in a same row of the pixel array, and wherein the second pixel group comprises a third pixel arranged in the same row as the first pixel and the second pixel,
wherein the first pixel comprises a first photodiode and a second photodiode arranged in a first direction, wherein the first photodiode of the first pixel is connected to a first transmission control line, and wherein the second photodiode of the first pixel is connected to a second transmission control line,
wherein the second pixel adjacent to the first pixel comprises a first photodiode and a second photodiode arranged in the first direction, wherein the first photodiode of the second pixel is connected to a third transmission control line, and wherein the second photodiode of the second pixel is connected to a fourth transmission control line, and
wherein the third pixel comprises a first photodiode and a second photodiode arranged in a second direction perpendicular to the first direction, wherein the first photodiode of the third pixel is connected to the first transmission control line, and wherein the second photodiode of the third pixel is connected to the second transmission control line.

9. The image sensor of claim 8, wherein each of the first pixel group and the second pixel group comprises pixels arranged in two or more rows and two or more columns.

10. The image sensor of claim 8, wherein the first pixel group comprises sixteen pixels arranged in four rows and four columns, including the first pixel and the second pixel, and wherein the second pixel group comprises sixteen pixels arranged in four rows and four columns, including the third pixel.

11. The image sensor of claim 8, wherein all of the pixels included in the first pixel group constitute the first pixel or the second pixel, and wherein all of the pixels included in the second pixel group constitute the third pixel.

12. The image sensor of claim 8, wherein the first pixel and the second pixel are connected to a first column line, and the third pixel is connected to a second column line.

13. The image sensor of claim 8, wherein the first pixel group comprises a first color filter, and the second pixel group comprises a second color filter.

14. The image sensor of claim 13, wherein the first color filter is a green color filter, and the second color filter is a blue color filter or a red color filter.

15. The image sensor of claim 8, wherein one micro lens is arranged in each of the plurality of pixels.

16. The image sensor of claim 8, wherein one micro lens is arranged in each of the first pixel group and the second pixel group.

17. The image sensor of claim 8, wherein the plurality of pixels included in the first pixel group share a floating diffusion region.

18. An image sensor, comprising:
a pixel array comprising a plurality of pixels arranged in a plurality of rows and a plurality of columns; and
transmission control lines configured to provide transmission control signals to the pixel array,
wherein the plurality of pixels comprises a first pixel, a second pixel, and a third pixel arranged in a same row of the pixel array,
wherein the first pixel is an AF (Auto-Focus) pixel comprising a first photodiode and a second photodiode arranged in a first direction, wherein the first photodiode of the first pixel is connected to a first transmission control line, and wherein the second photodiode of the first pixel is connected to a second transmission control line,
wherein the second pixel adjacent to the first pixel is an AF pixel comprising a first photodiode and a second photodiode arranged in the first direction, wherein the first photodiode of the second pixel is connected to a third transmission control line, and wherein the second photodiode of the second pixel is connected to a fourth transmission control line, and
wherein the third pixel is an AF pixel comprising a first photodiode and a second photodiode arranged in a second direction perpendicular to the first direction, wherein the first photodiode of the third pixel is connected to the first transmission control line, and wherein the second photodiode of the third pixel is connected to the second transmission control line.

19. The image sensor of claim 18, wherein the first pixel and the second pixel are connected to a first column line, and the third pixel is connected to a second column line.

20. The image sensor of claim 18, wherein one micro lens is arranged in each of the plurality of pixels.

* * * * *